US008411125B2

(12) United States Patent
Imai

(10) Patent No.: US 8,411,125 B2
(45) Date of Patent: Apr. 2, 2013

(54) EXPOSURE DEVICE AND IMAGE FORMING APPARATUS, WITH DRIVING UNIT SETTING BARYCENTRIC POSITION

(75) Inventor: Shigeaki Imai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 155 days.

(21) Appl. No.: 12/908,388

(22) Filed: Oct. 20, 2010

(65) Prior Publication Data

US 2011/0102536 A1     May 5, 2011

(30) Foreign Application Priority Data

Nov. 2, 2009  (JP) ................................. 2009-252133

(51) Int. Cl.
B41J 2/47 (2006.01)
(52) U.S. Cl. ....................................................... 347/254
(58) Field of Classification Search .................. 347/224, 347/225, 229, 234, 237, 238, 240, 247–249, 347/251–254
See application file for complete search history.

(56) References Cited

U.S. PATENT DOCUMENTS

| | | | | |
|---|---|---|---|---|
| 5,640,191 A * | 6/1997 | Zulian et al. | .................... | 347/247 |
| 5,790,764 A * | 8/1998 | Suzuki | ............................ | 358/1.9 |
| 6,750,895 B1 * | 6/2004 | Otose et al. | .................... | 347/238 |
| 6,813,051 B2 | 11/2004 | Suzuki et al. | | |
| 6,942,310 B2 * | 9/2005 | Kanda et al. | .................... | 347/15 |
| 7,081,913 B2 * | 7/2006 | Ono | .............................. | 347/252 |
| 7,277,212 B2 | 10/2007 | Miyatake et al. | | |
| 7,564,607 B2 | 7/2009 | Imai | | |
| 7,619,796 B2 | 11/2009 | Imai | | |
| 7,643,046 B2 | 1/2010 | Imai et al. | | |
| 7,728,863 B2 | 6/2010 | Miyatake et al. | | |
| 7,751,107 B2 | 7/2010 | Imai | | |
| 7,755,822 B2 | 7/2010 | Imai | | |
| 2002/0057470 A1 * | 5/2002 | Koide et al. | ................... | 358/513 |
| 2005/0190420 A1 | 9/2005 | Imai et al. | | |
| 2006/0158711 A1 | 7/2006 | Imai et al. | | |
| 2007/0058255 A1 | 3/2007 | Imai et al. | | |
| 2008/0019255 A1 | 1/2008 | Imai et al. | | |
| 2008/0068678 A1 | 3/2008 | Suzuki et al. | | |
| 2008/0170283 A1 | 7/2008 | Imai | | |
| 2008/0192323 A1 | 8/2008 | Nakamura et al. | | |
| 2009/0058979 A1 | 3/2009 | Saisho et al. | | |
| 2009/0074437 A1 | 3/2009 | Tanabe et al. | | |
| 2009/0225385 A1 | 9/2009 | Imai | | |

FOREIGN PATENT DOCUMENTS

JP           11-254737 A      9/1999

\* cited by examiner

*Primary Examiner* — Hai C Pham
(74) *Attorney, Agent, or Firm* — Dickstein Shapiro LLP

(57) ABSTRACT

Each of a plurality of pixels is formed with a group of a plurality of spots or a single spot. The barycentric position of each pixel is determined by the distribution of the spots or the position of the single spot. While the number of pixels on the exposure object is maintained in a first direction corresponding to the array direction of the light sources, an exposure feasible width on an exposure object can be adjusted in the first direction by setting the barycentric position at least in the first direction out of the first direction and a second direction that is the moving direction of the exposure object.

13 Claims, 14 Drawing Sheets

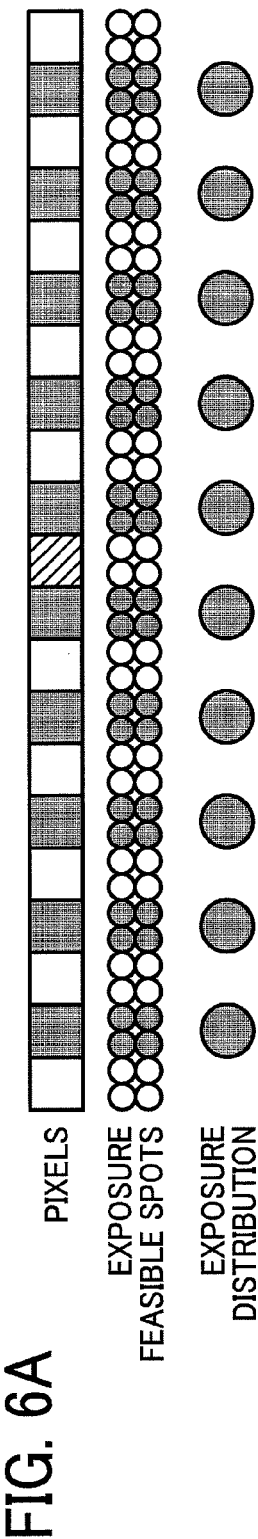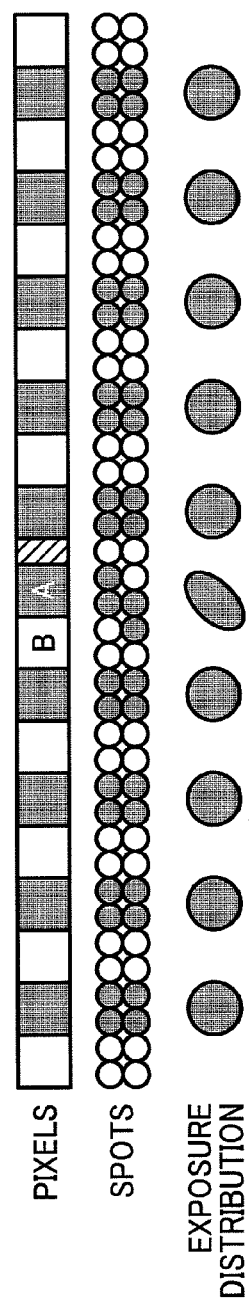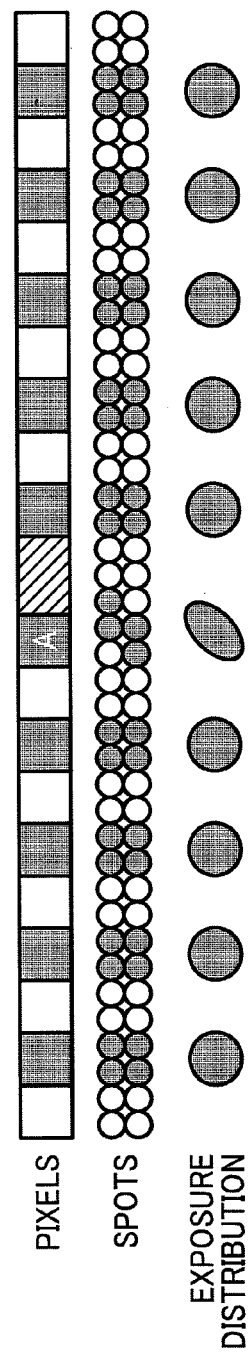

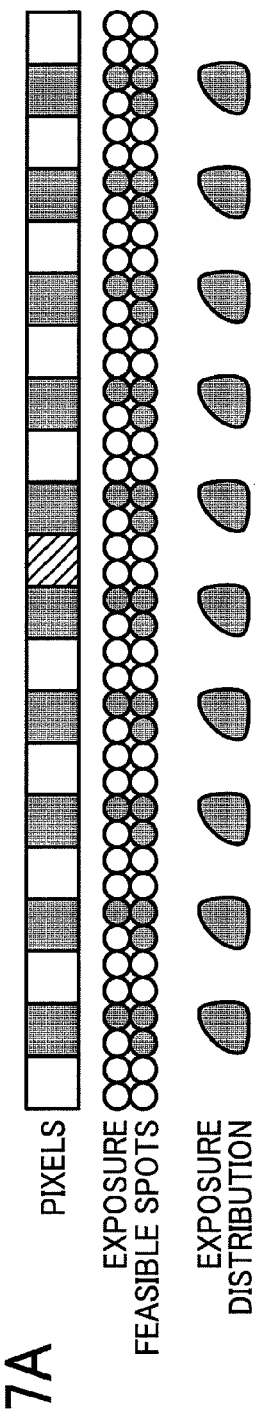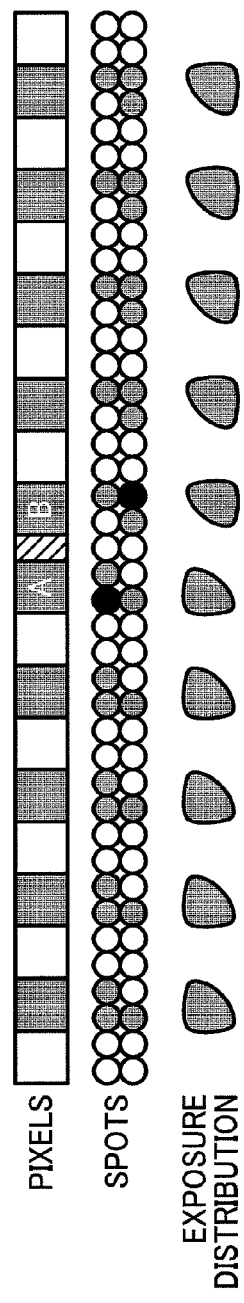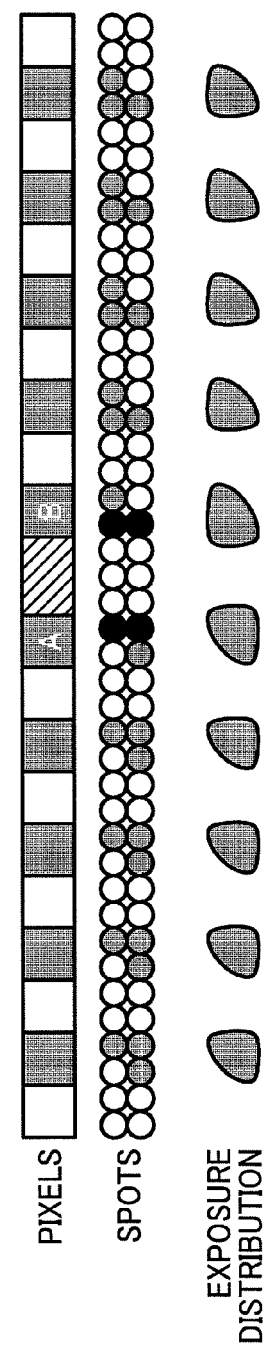

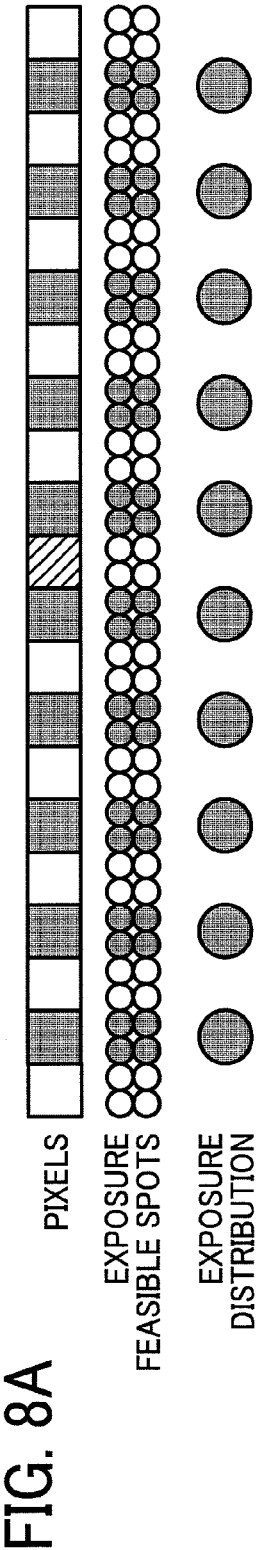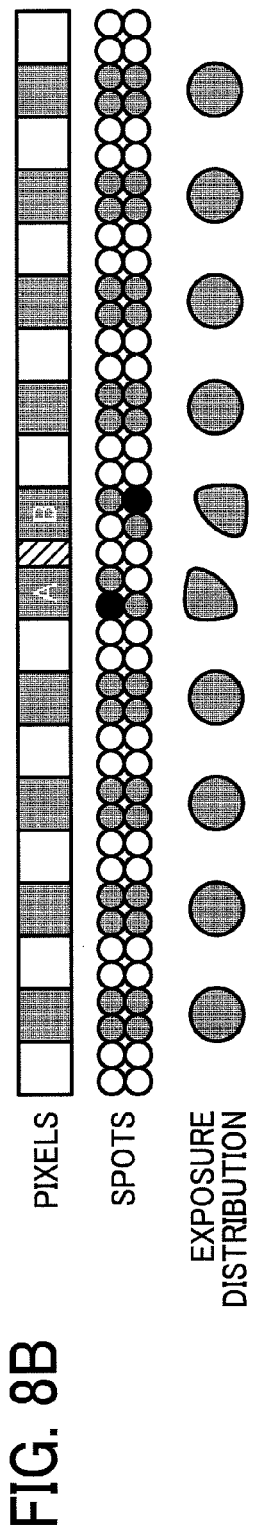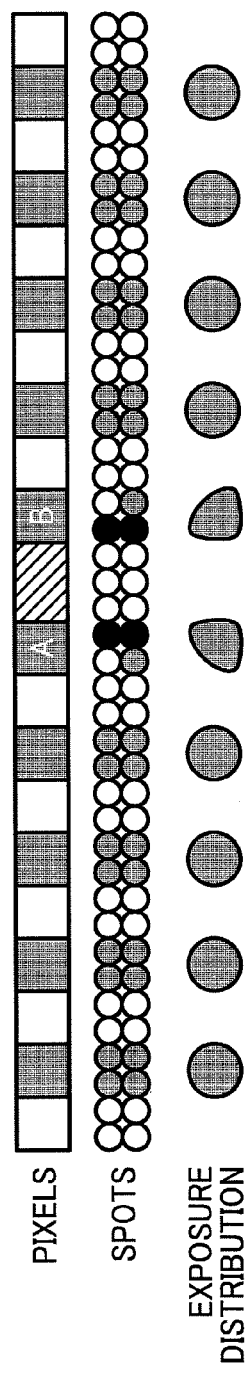

FIG. 10A
BEFORE
CORRECTION
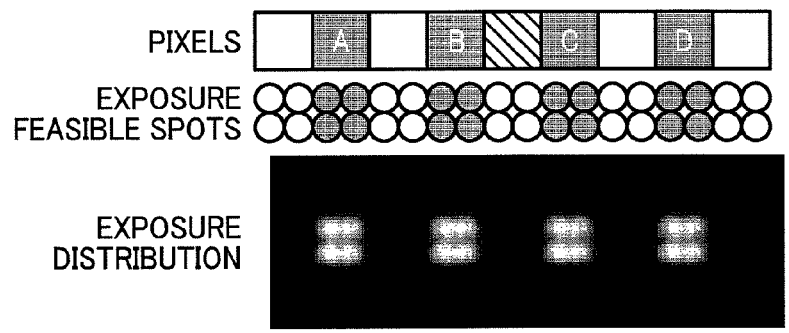
FIG. 10B
AFTER
CORRECTION
(WHEN INTERVAL
IS REDUCED)
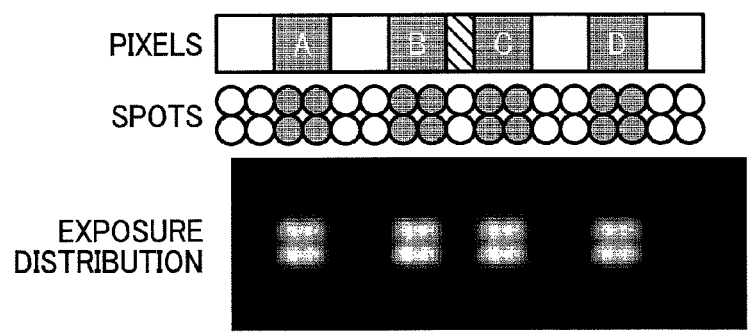
FIG. 10C
AFTER
CORRECTION
(WHEN INTERVAL
IS INCREASED)
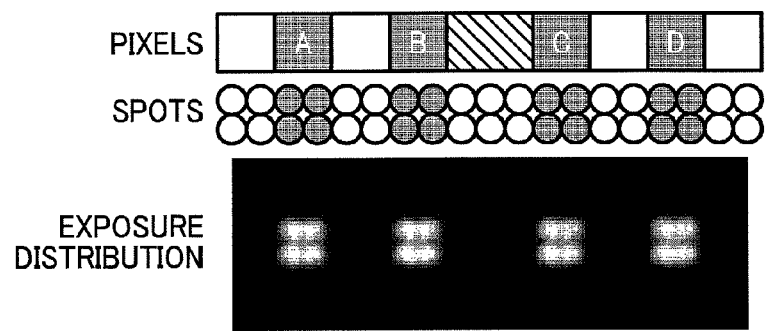
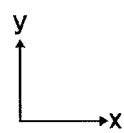

FIG. 10D

BARYCENTRIC POSITION

| BEFORE CORRECTION | A | B | C | D |
|---|---|---|---|---|
|  | 4 DOTS | 4 DOTS | 4 DOTS | 4 DOTS |
| BARYCENTRIC POSITION x [$\mu$m] | 0.0 | 0.0 | 0.0 | 0.0 |
| BARYCENTRIC POSITION y [$\mu$m] | 0.0 | 0.0 | 0.0 | 0.0 |
| INTERVAL BETWEEN PIXELS |  | 42.3 | 42.3 | 42.3 |
| DISTANCE BETWEEN BARYCENTERS [$\mu$m] |  | 42.3 | 42.3 | 42.3 |

| WHEN REDUCED | A | B | C | D |
|---|---|---|---|---|
|  | 4 DOTS | 4 DOTS | 4 DOTS | 4 DOTS |
| BARYCENTRIC POSITION x [$\mu$m] | 0.0 | 0.0 | 0.0 | 0.0 |
| BARYCENTRIC POSITION y [$\mu$m] | 0.0 | 0.0 | 0.0 | 0.0 |
| INTERVAL BETWEEN PIXELS |  | 42.3 | 21.2 | 42.3 |
| DISTANCE BETWEEN BARYCENTERS [$\mu$m] |  | 42.3 | 21.2 | 42.3 |

| WHEN INCREASED | A | B | C | D |
|---|---|---|---|---|
|  | 4 DOTS | 4 DOTS | 4 DOTS | 4 DOTS |
| BARYCENTRIC POSITION x [$\mu$m] | 0.0 | 0.0 | 0.0 | 0.0 |
| BARYCENTRIC POSITION y [$\mu$m] | 0.0 | 0.0 | 0.0 | 0.0 |
| INTERVAL BETWEEN PIXELS |  | 42.3 | 63.5 | 42.3 |
| DISTANCE BETWEEN BARYCENTERS [$\mu$m] |  | 42.3 | 63.5 | 42.3 |

FIG. 11A
BEFORE
CORRECTION
PIXELS
EXPOSURE FEASIBLE SPOTS
EXPOSURE DISTRIBUTION
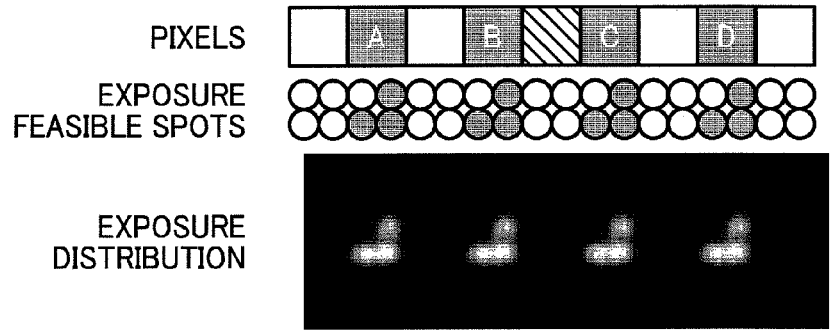
FIG. 11B
AFTER
CORRECTION
(WHEN INTERVAL
IS REDUCED)
PIXELS
SPOTS
EXPOSURE DISTRIBUTION
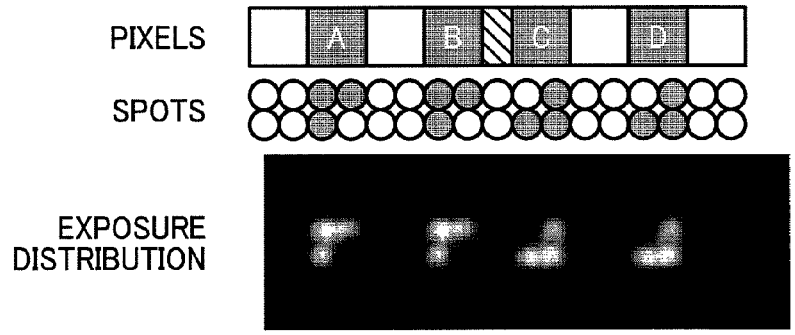
FIG. 11C
AFTER
CORRECTION
(WHEN INTERVAL
IS INCREASED)
PIXELS
SPOTS
EXPOSURE DISTRIBUTION
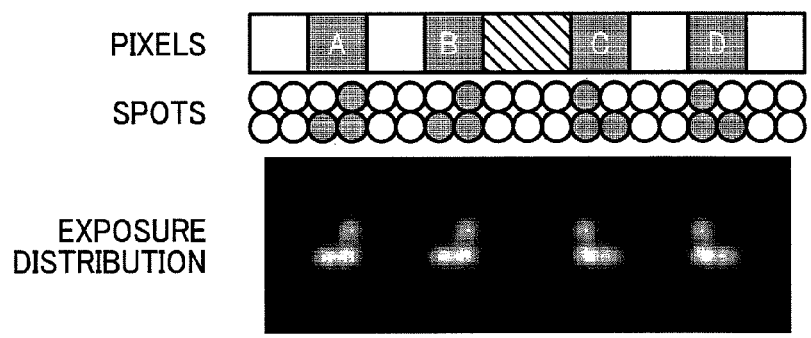
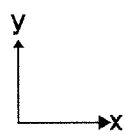

FIG. 11D

BARYCENTRIC POSITION

| BEFORE CORRECTION | A | B | C | D |
|---|---|---|---|---|
|  | 3 DOTS AT LOWER RIGHT | 3 DOTS AT LOWER RIGHT | 3 DOTS AT LOWER RIGHT | 3 DOTS AT LOWER RIGHT |
| BARYCENTRIC POSITION x [μm] | 4.0 | 4.0 | 4.0 | 4.0 |
| BARYCENTRIC POSITION y [μm] | −3.3 | −3.3 | −3.3 | −3.3 |
| INTERVAL BETWEEN PIXELS |  | 42.3 | 42.3 | 42.3 |
| DISTANCE BETWEEN BARYCENTERS [μm] |  | 42.3 | 42.3 | 42.3 |

| WHEN REDUCED | A | B | C | D |
|---|---|---|---|---|
|  | 3 DOTS AT UPPER LEFT | 3 DOTS AT UPPER LEFT | 3 DOTS AT LOWER RIGHT | 3 DOTS AT LOWER RIGHT |
| BARYCENTRIC POSITION x [μm] | −4.1 | −4.1 | −4.0 | −4.0 |
| BARYCENTRIC POSITION y [μm] | 5.0 | 5.0 | −3.3 | −3.3 |
| INTERVAL BETWEEN PIXELS |  | 42.3 | 21.2 | 42.3 |
| DISTANCE BETWEEN BARYCENTERS [μm] |  | 42.3 | 30.4 | 42.3 |

| WHEN INCREASED | A | B | C | D |
|---|---|---|---|---|
|  | 3 DOTS AT LOWER RIGHT | 3 DOTS AT LOWER RIGHT | 3 DOTS AT LOWER LEFT | 3 DOTS AT LOWER LEFT |
| BARYCENTRIC POSITION x [μm] | 4.0 | 4.0 | −4.1 | −4.1 |
| BARYCENTRIC POSITION y [μm] | −3.3 | −3.3 | −3.4 | −3.4 |
| INTERVAL BETWEEN PIXELS |  | 42.3 | 63.5 | 42.3 |
| DISTANCE BETWEEN BARYCENTERS [μm] |  | 42.3 | 55.4 | 42.3 |

EXPOSURE DEVICE AND IMAGE FORMING APPARATUS, WITH DRIVING UNIT SETTING BARYCENTRIC POSITION

CROSS-REFERENCE TO RELATED APPLICATIONS

The present application claims priority to and incorporates by reference the entire contents of Japanese Patent Application No. 2009-252133 filed in Japan on Nov. 2, 2009.

BACKGROUND OF THE INVENTION

1. Field of the Invention

The present invention relates to an exposure device that is included in an image forming apparatus such as a copier, a printer, and a facsimile and that includes a plurality of light sources linearly arranged for exposing an exposure object such as an image carrier to light. The present invention also relates to the image forming apparatus including the exposure device.

2. Description of the Related Art

In recent years, exposure devices that expose the surface of an exposure object such as an image carrier as a photosensitive body to light based on light information according to information of images to be formed are known for use in image forming apparatuses such as copiers, printers, and facsimiles.

The types of exposure devices include: a first type including an optical scanner in which a light source and a polariscope such as a polygon motor are combined; and a second type including an array light source device that includes a print head collectively exposing the surface of an exposure object to light in a main-scanning direction using a light emitting diode (LED) array or an organic electroluminescent (EL) array that includes a plurality of light sources linearly arranged and a rod lens array, as disclosed in, for example, Japanese Patent Application Laid-open No. H11-254737.

The advantages of the second type against the first type include: (1) having a small size; (2) having a small beam diameter to be written on an exposure object; and (3) having a long service life. A small exposure device contributes to downsizing of an image forming apparatus. A small beam diameter contributes to higher image quality. A long service life contributes to a longer service life of an image forming apparatus and recycling of the exposure device.

A print head in the exposure device of the second type having a structure using an LED array as the print head is produced by connecting a plurality of LED array chips. Therefore, an exposure feasible width on an exposure object corresponding to a plurality of light sources in an array direction varies depending on each print head due to a mounting error of LED array chips or similar defects. As a result, an image forming width varies depending on each exposure device. In an image forming apparatus that includes a plurality of exposure devices and forms color images, when exposure feasible widths of exposure devices are different from each other, a color shift occurs during color image formation thus lowering the image quality.

This color shift similarly occurs in an exposure device of the second type having a structure using an organic EL array as the print head. This is because the exposure feasible widths also vary depending on each print head due to the influence of a producing error of the organic EL array.

Examples of measures against such problems include correction of the exposure feasible widths by adding or deleting image data used for driving the print head in the array direction of a plurality of light sources. However, when the image data is simply deleted or added, image disturbance occurs at a portion where the addition or deletion is performed along a moving direction of an exposure object, for example, a rotation direction of a photosensitive body to generate a so-called vertical streak on the output image. The vertical streak is easily noticeable particularly on a halftone image.

For example, Japanese Patent Application Laid-open No. H11-254737 discloses a technique in which each pixel includes a plurality of LED elements as measures against vertical streaks arising from fluctuation in a light amount of each LED element.

However, even when such a technique is used, vertical streaks are still generated by adding or deleting image data used for driving a print head in the array direction of a plurality of light sources in order to correct the exposure feasible widths.

Moreover, for making such an exposure feasible width of each print head uniform to be a level in which a color shift caused during color image formation becomes unnoticeable, a manufacturing technique and a mounting technique with an extremely high precision are required, or the yield is lowered, which drives up costs.

SUMMARY OF THE INVENTION

It is an object of the present invention to at least partially solve the problems in the conventional technology.

According to an aspect of the present invention, an exposure device includes: an exposure unit including a plurality of light sources linearly arranged; and a driving unit that is capable of driving each of the light sources to make the exposure unit expose an exposure object, the exposure device forms a plurality of pixels with spots on the exposure object at a position corresponding to the light sources, each of the pixels is formed with a group of a plurality of spots or a single spot, a barycentric position of each of the pixels is determined by distribution of the spots or a position of the single spot, and while the driving unit maintains number of pixels on the exposure object in a first direction corresponding to an array direction of the light sources, an exposure feasible width within which the exposure unit performs exposure on the exposure object is adjustable in the first direction by the driving unit setting the barycentric position at least in the first direction out of the first direction and a second direction that is a moving direction of the exposure object.

According to another aspect of the present invention, an exposure device includes: an exposure unit including a plurality of light sources linearly arranged; and a driving unit that is capable of driving each of the light sources to make the exposure unit expose an exposure object, the driving unit is capable of forming besides a basic pixel formed on the exposure object by a predetermined number of light sources included in the plurality of light sources, an adjustment pixel formed on the exposure object by light sources whose number is different from the predetermined number and that are included in the plurality of light sources so that an exposure feasible width within which the exposure unit performs exposure on the exposure object is adjustable in an array direction of the plurality of light sources while the number of pixels on the exposure object is maintained in the array direction.

The above and other objects, features, advantages and technical and industrial significance of this invention will be better understood by reading the following detailed descrip-

BRIEF DESCRIPTION OF THE DRAWINGS

FIGS. 6A to 6C are conceptual diagrams illustrating a fourth exposure mode performed by the exposure device included in the image forming apparatus as illustrated in FIG. 1;

FIGS. 7A to 7C are conceptual diagrams illustrating a fifth exposure mode performed by the exposure device included in the image forming apparatus as illustrated in FIG. 1;

FIGS. 8A to 8C are conceptual diagrams illustrating a sixth exposure mode performed by the exposure device included in the image forming apparatus as illustrated in FIG. 1;

FIGS. 10A to 10D are conceptual diagrams and tables of a simulation result of an exposure mode performed by the exposure device included in the image forming apparatus as illustrated in FIG. 1;

FIGS. 11A to 11D are conceptual diagrams and tables of another simulation result of an exposure mode performed by the exposure device included in the image forming apparatus as illustrated in FIG. 1.

DETAILED DESCRIPTION OF THE PREFERRED EMBODIMENTS

Figure 1:
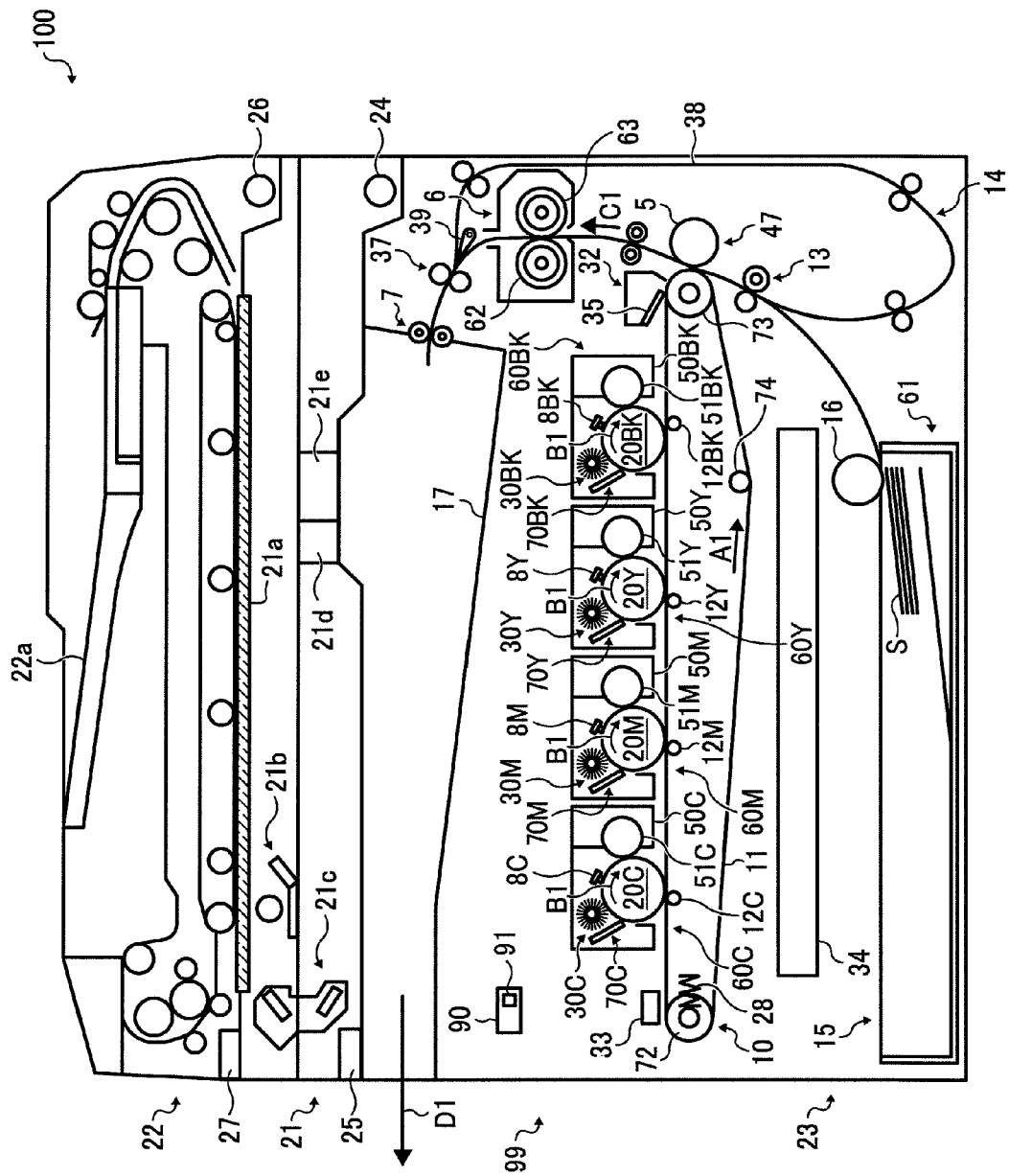
FIG. 1 is a schematic elevation of an image forming apparatus to which an embodiment of the present invention is applied.

FIG. 1 is a schematic of an image forming apparatus to which an embodiment of the present invention is applied. An image forming apparatus 100 is a multifunction device of a copier, a printer, and a facsimile and can form images in full color. When the image forming apparatus 100 is used as a printer or a facsimile, image forming process is performed based on image signals corresponding to image information received from the exterior.

The image forming apparatus 100 can form images on besides plain paper typically used for copying or similar processes, any of an overhead projector (OHP) sheet, thick paper such as a card and a postal card, an envelope, and similar paper as a sheet recording medium that is a transfer material and is recording paper. Moreover, the image forming apparatus 100 can form images on both sides of transfer paper S as a transfer medium that is a recording medium.

The image forming apparatus 100 is an image forming apparatus employing a tandem structure in which cylindrical photosensitive drums 20BK, 20Y, 20M, and 20C that are latent image carriers as a plurality of image carriers capable of forming images as images corresponding to colors separated into yellow, magenta, cyan, and black are arranged in parallel. In other words, the image forming apparatus 100 is a tandem system, that is, a tandem image forming apparatus.

The photosensitive drums 20BK, 20Y, 20M, and 20C have the same diameter of a diameter of φ24 millimeters. The photosensitive drums 20BK, 20Y, 20M, and 20C are spaced uniformly adjacent to the peripheral surface of a transfer belt 11 as an intermediate transfer belt as an intermediate transfer body that is an endless belt arranged at the substantially center of the interior of a main body 99 of the image forming apparatus 100, in other words, adjacent to an image formation surface. The transfer belt 11 is movable in an arrow A1 direction while facing the photosensitive drums 20BK, 20Y, 20M, and 20C.

The photosensitive drums 20BK, 20Y, 20M, and 20C are arranged in parallel from the upstream side in the arrow A1 direction in this order. Image stations 60BK, 60Y, 60M, and 60C that are image forming units include the photosensitive drums 20BK, 20Y, 20M, and 20C for forming black, yellow, magenta, and cyan images, respectively.

Toner images as visible images formed on the photosensitive drums 20BK, 20Y, 20M, and 20C are superimposed and transferred onto the transfer belt 11 moving in the arrow A1 direction, and then are transferred onto the transfer paper S at a time.

The superimposition and transfer onto the transfer belt 11 are performed at a transfer position that is a position where the photosensitive drums 20BK, 20Y, 20M, and 20C face the transfer belt 11 during a process in which the transfer belt 11 moves in the A1 direction. In the process, the superimposition and transfer are performed by shifting the time from the upstream side to the downstream side in the A1 direction so that the toner images formed on the photosensitive drums 20BK, 20Y, 20M, and 20C are superimposed and transferred at the same position on the transfer belt 11. The time shift is performed by applying voltage by primary transfer rollers 12BK, 12Y, 12M, and 12C that are transfer charging units as transfer chargers arranged at positions opposite to the respective photosensitive drums 20BK, 20Y, 20M, and 20C with the transfer belt 11 interposed therebetween.

The transfer belt 11 preferably employs an endless belt made of a resin film in which a conductive material such as carbon black is dispersed in polyvinylidene fluoride (PVDF), ethylene tetrafluoroethylene (ETFE), polyimide (PI), polycarbonate (PC), thermoplastic elastomers (TPE), or similar compounds. In the present embodiment of the present invention, the belt member has a single layer structure in which carbon black is added to TPE having a tensile elastic modulus of 1000 megapascals to 2000 megapascals, has a thickness of 100 micrometers to 200 micrometers, and has a width of 230 millimeters.

The resistance of the transfer belt 11 desirably falls within the range of a volume resistivity of $10^8$ Ω·cm to $10^{11}$ Ω·cm and of a surface resistivity of $10^8$ Ω/sq to $10^{11}$ Ω/sq. (both the volume resistivity and the surface resistivity are measured at the condition of an applied voltage of 500 volts and of an applied time of 10 seconds by HirestaUP MCP-HT450 manufactured by Mitsubishi Chemical Corporation) in the environment at 23° C. and 50% RH. When the volume resistivity and the surface resistivity exceed the above-described range, the transfer belt 11 is charged. Therefore, it is necessary to take measures in which the set voltage value is set higher in accordance with the order of image formation in the downstream direction in the A1 direction. In other words, among the image stations 60BK, 60Y, 60M, and 60C, the set voltage value is set higher in accordance with the above-described positional order, setting the set voltage value for 60C the highest. This leads to difficulties in the use of a single supplying power source to primary transfer portions. This is caused because the charge potential at the surface of the transfer belt 11 increases by the discharge caused during a transfer process, a transfer material separation process, or similar processes, and self-discharge becomes difficult. Therefore, a neutralizing unit for the transfer belt 11 is required to be provided as a measure. When the volume resistivity and the surface resistivity fall below the range, the charge potential quickly decays, which is advantageous in terms of neutralization by self-discharge. However, toner scattering occurs because the current during transfer flows in the surface direction. Accordingly, the volume resistivity and the surface resistivity of the transfer belt 11 fall within the above described range in the present embodiment.

The image forming apparatus 100 includes: a main body 99 that occupies a central position in a vertical direction; a reading device 21 as a scanner that is positioned on the main body 99 and reads an original; an automatic original feed device 22 called automatic document feeder (ADF) that is positioned on the reading device 21, in which an original is loaded, and that feeds the loaded original into the reading device 21; and a sheet feed device 23 as a feed table that is positioned below the main body 99.

The image forming apparatus 100 also includes: the four image stations 60BK, 60Y, 60M, and 60C; a transfer belt unit 10 as an intermediate transfer unit that is an intermediate transfer device arranged below the photosensitive drums 20BK, 20Y, 20M, and 20C so as to be faced and including the transfer belt 11; and a secondary transfer device 47 that is a secondary transfer unit as a transfer unit that transfers a toner image on the transfer belt 11 onto the transfer paper S.

The image forming apparatus 100 also includes: a cleaning device 32 that is an intermediate transfer belt cleaning unit as an intermediate transfer belt cleaning device; and a toner mark sensor 33 arranged downstream of the image station 60C in the arrow A1 direction at a position facing the upper surface of the transfer belt 11. The cleaning device 32 is arranged so as to face the transfer belt 11 at a position between the secondary transfer device 47 and the image station 60BK in the A1 direction and cleans the top of the transfer belt 11.

The image forming apparatus 100 also includes: a used toner accommodating unit 34 for an intermediate transfer body that is arranged below the transfer belt unit 10 so as to face the transfer belt unit 10; and a toner conveying path (not illustrated) through which the cleaning device 32 is connected with the used toner accommodating unit 34 for an intermediate transfer body.

The image forming apparatus 100 also includes: a pair of registration rollers 13 that feeds the transfer paper S conveyed from the sheet feed device 23 into a secondary transfer portion between the transfer belt 11 and the secondary transfer device 47 at predetermined timing corresponding to timing of the formation of a toner image by the image stations 60BK, 60Y, 60M, and 60C; and a sensor (not illustrated) detecting that the leading end of the transfer paper S reaches the pair of registration rollers 13.

The image forming apparatus 100 also includes: a fixing device 6 as a fixing unit of a roller fixing system that fixes a toner image on the transfer paper S on which the toner image is transferred and that is fed by being conveyed in an arrow C1 direction; discharging rollers 7 that discharge the transfer paper S passed through the fixing device 6 to the exterior of the main body 99; and a reverse feed device 14 reversing the transfer paper S that is passed through the fixing device 6 and has an image formed on its single side to feed the paper into the pair of registration rollers 13 again.

The image forming apparatus 100 also includes: a discharge tray 17 as a discharge unit that is arranged at the upper portion of the main body 99 and on which the transfer paper S discharged to the exterior of the main body 99 by the discharging rollers 7 is loaded; and toner bottles (not illustrated) filled with yellow, magenta, cyan, and black toner, respectively.

The image forming apparatus 100 also includes: a controller 90 that controls the image stations 60BK, 60Y, 60M, and 60C, and the whole actions such as the action of the image forming apparatus 100; and an operation panel (not illustrated) with which an operator such as a user operates the image forming apparatus 100.

The image forming apparatus 100 is an in-body paper discharge type image forming apparatus in which the discharge tray 17 is positioned at the upper portion of the main body 99 and below the reading device 21. The transfer paper S loaded on the discharge tray 17 is discharged to the downstream side in a D1 direction that is a leftward direction as viewed in FIG. 1.

The transfer belt unit 10 includes: the transfer belt 11; the primary transfer rollers 12BK, 12Y, 12M, and 12C; a tension roller 72 wrapped with the transfer belt 11; a transfer entrance roller 73 as a secondary transfer counter roller that also works as a driving roller and a stretching roller 74 as a driven roller; a spring 28 that biases the tension roller 72 in a direction away from the transfer entrance roller 73; and a pair of intermediate transfer unit side plates (not illustrated) that rotatably supports each roller stretching the transfer belt 11, that is, each of the tension roller 72, the transfer entrance roller 73, and the stretching roller 74 from both sides thereof and that is arranged so as to interpose the transfer belt 11.

The tension roller 72 is a pipe made of aluminum having a diameter of $\phi 20$ millimeters. Collars (not illustrated) having diameters of $\phi 24$ millimeters are press-fitted into both ends of the roller. The collars function as controlling members that control meandering of the transfer belt 11.

The spring 28 is provided at the intermediate transfer unit side plates and biases both ends of the tension roller 72 to hold the transfer belt 11 under a predetermined tension.

The transfer entrance roller 73 is a urethane coated roller that has a thickness of 0.05 millimeter and a diameter of $\phi 20$ millimeters, in which the change in diameter due to temperature is small. Moreover, a polyurethane rubber having a thickness of 0.3 millimeter to 1 millimeter, a thin-layer coated roller having a thickness of 0.03 millimeter to 0.1 millimeter, or other rollers are also applicable to the transfer entrance roller 73. The transfer entrance roller 73 is driven in rotation by driving a motor as a driving source (not illustrated) and thus drives the transfer belt 11 in rotation in the A1 direction.

The primary transfer rollers 12BK, 12Y, 12M, and 12C are metal rollers having a diameter of $\phi 8$ millimeters; however a conductive blade, a conductive sponge roller, or other rollers are applicable to the primary transfer rollers 12BK, 12Y, 12M, and 12C.

The primary transfer rollers 12BK, 12Y, 12M, and 12C are connected to unillustrated high voltage power sources 31BK, 31Y, 31M, and 31C, respectively, and apply transfer bias of the same value in a range of +500 volts to +1000 volts to the photosensitive drums 20BK, 20Y, 20M, and 20C to transfer toner images on the photosensitive drums 20BK, 20Y, 20M, and 20C onto the transfer belt 11.

The secondary transfer device 47 is arranged so as to face the transfer entrance roller 73 and comes in contact with the transfer belt 11 and includes: a secondary transfer roller 5 that is a secondary transfer counter roller as a transfer member rotating in the same direction with the transfer belt 11 at a position contacting with the transfer belt 11; and a high voltage power source (not illustrated) that is connected with the secondary transfer roller 5 and applies secondary transfer bias to the transfer belt 11 to transfer the toner image on the transfer belt 11 onto the transfer paper S. The controller 90 controls the bias value applied by the high voltage power source.

The secondary transfer roller 5 faces the transfer entrance roller 73 via the transfer belt 11 and forms a secondary transfer portion at a position between the secondary transfer roller 5 and the transfer belt 11 The secondary transfer roller 5 is formed by applying an elastic body made of urethane that has a resistance value adjusted within $10^6$ ohms to $10^{10}$ ohms using a conductive material on a core made of a metal such as stainless steel (SUS), and thus has a diameter of ϕ20 millimeters and an Asker C hardness of 35 degrees to 50 degrees. Moreover, the secondary transfer roller 5 may be an ion conductive roller (urethane+carbon dispersion, nitrile rubber (NBR), Hydrin), an electron conductive type roller (ethylene-propylene rubber (EPDM)), or other rollers, and may employ other materials for the elastic body.

The secondary transfer roller 5 has a resistance value of $10^6$ ohms to $10^{10}$ ohms because when the resistance value exceeds the upper limit, current is difficult to flow, and therefore, a high voltage needs to be applied in order to obtain necessary transferability, which increases power source cost. Moreover, electrical discharge occurs in a space formed front or back of the secondary transfer nip because high voltage needs to be applied, which generates white dots on a halftone image due to the discharge. The white dots generation is conspicuous in a low-temperature and low-humidity environment (for example, at 10° C. and 15% RH).

The secondary transfer roller 5 has a resistance value of $10^6$ ohms to $10^{10}$ ohms because when the resistance value falls below the lower limit, transferability of an image portion in a plurality of colors (for example, a three-color superimposed image) and an image portion in a single color both of which are present on the same image are incompatible. The transferability is incompatible because when the secondary transfer roller 5 has a low resistance value, current sufficient for transferring the image portion in a single color flows at a comparatively low voltage, but voltage higher than the voltage optimal for the image portion in a single color is required for transferring the image portion in colors. Accordingly, when the voltage is set at the voltage with which the image portion in colors can be transferred, the transfer current in the image portion in a single color becomes excessive to incur lower transfer efficiency.

The resistance value of the secondary transfer roller 5 is measured by installing the secondary transfer roller 5 in a conductive metal plate and by calculating from the current value that flows when a voltage of 1 kilovolt is applied between the core and the conductive metal plate in a state where a load of 4.9 newtons is loaded on each of both ends of the core.

The secondary transfer roller 5 occupies a position apart from the transfer belt 11 during the formation of a reference toner image described later.

As illustrated in FIG. 1, the cleaning device 32 includes an intermediate transfer cleaning blade 35 as a cleaning blade contacting with the transfer belt 11 at a position facing the transfer entrance roller 73, and cleans the transfer belt 11 by scraping unwanted substances such as toner left untransferred and paper powder that are on the transfer belt 11 using the intermediate transfer cleaning blade 35.

The cleaning device 32 also removes the reference toner image described later from the transfer belt 11 to clean the belt.

The intermediate transfer cleaning blade 35 is a urethane rubber blade having a thickness of 1.5 millimeters to 3 millimeters and a rubber hardness of 65 degrees to 80 degrees and counter abuts the transfer belt 11. The unwanted substances such as toner left untransferred scraped by the intermediate transfer cleaning blade 35 pass through the toner conveying path and is stored in the used toner accommodating unit 34 for an intermediate transfer body. At least one of a portion of the transfer belt 11 corresponding to a cleaning nip contacting with the intermediate transfer cleaning blade 35 and an edge of the intermediate transfer cleaning blade 35 is coated with an application agent such as lubricant, toner, or zinc stearate during installation. Thus, the rolling-up of the intermediate transfer cleaning blade 35 at the cleaning nip is prevented. Moreover, cleaning performance is enhanced by forming a dam layer at the cleaning nip.

The toner mark sensor 33 is called a TM sensor and measures the concentration of toner of the toner images on the transfer belt 11 and the positions of the toner images in each color while concentration of images and color matching are adjusted.

The fixing device 6 includes a fixing roller 62 having a heat source therein and a pressurizing roller 63 pressurized by the fixing roller 62. The fixing device 6 fixes a toner image supported on the surface of the transfer paper S by the action of heat and pressure by passing the transfer paper S on which the toner image is supported through a fixing portion as a fixing nip that is a portion pressurized by the fixing roller 62 and the pressurizing roller 63.

The fixing device 6 changes process speed, that is, rotation speed of the fixing roller 62 and the pressurizing roller 63 during the fixation depending on the type of the transfer paper S. Specifically, when paper has a basis weight of equal to or more than 100 g/m², the process speed is set to be the half speed so that the transfer paper S passes the fixing portion while taking twice the normal time. As a result, the fixability of a toner image can be ensured.

The sheet feed device 23 includes a paper feed tray 15 on which the transfer paper S is loaded, and a paper feed roller 16 as a fed paper conveying roller that feeds the transfer paper S loaded on the paper feed tray 15.

The reading device 21 is positioned on the main body 99, is rotatably integrated with the main body 99 at the upstream end of the image forming apparatus 100 in the D1 direction, that is, at a shaft 24 arranged close to the back of the image forming apparatus 100, and is provided as a first opening and closing body openable and closable relative to the main body 99.

The reading device 21 includes a gripper 25 as a first gripper for a grip when the reading device 21 is opened relative to the main body 99, at the downstream end of the reading device 21 in the D1 direction. The reading device 21 is rotatable around the shaft 24 and is opened relative to the main body 99 by gripping the gripper 25 to upwardly rotate the device. The open angle of the reading device 21 relative to the main body 99 is about 90 degrees, which eases access to the inside of the main body 99, action of closing the reading device 21, or similar actions.

The reading device 21 includes: for example, a contact glass 21a on which an original is placed; a first traveling body 21b that includes a light source (not illustrated) radiating light on the original placed on the contact glass 21a and a first reflector (not illustrated) reflecting light radiated from the light source on the original and reflected from the original, and that travels in a horizontal direction as viewed in FIG. 1; a second traveling body 21c that includes a second reflector (not illustrated) reflecting light reflected by the reflector of the first traveling body 21b; an imaging lens 21d for forming an image from light reflected from the second traveling body 21c; and a reading sensor 21e that receives light passed through the imaging lens 21d and reads the content of the original.

The automatic original feed device 22 is positioned above the reading device 21, is rotatably integrated with the reading device 21 at a shaft 26 arranged at the upstream end of the image forming apparatus 100 in the D1 direction, and is provided as a second opening and closing body openable and closable relative to the reading device 21.

The automatic original feed device 22 includes a gripper 27 as a second gripper for a grip when the automatic original feed device 22 is opened relative to the reading device 21, at the downstream end of the automatic original feed device 22 in the D1 direction. The automatic original feed device 22 is rotatable around the shaft 26 and is opened relative to the reading device 21 by gripping the gripper 27 to upwardly rotate the device, thereby exposing the contact glass 21a.

The automatic original feed device 22 includes: an original table 22a on which an original is placed; and a driving unit that feeds the original placed on the original table 22a and includes a motor (not illustrated) or similar units. For making a copy using the image forming apparatus 100, an original is set on the original table 22a of the automatic original feed device 22, or an original is manually placed on the contact glass 21a by upwardly rotating the automatic original feed device 22, and then the automatic original feed device 22 is closed to press the original on the contact glass 21a. The open angle of the automatic original feed device 22 relative to the reading device 21 is about 90 degrees, which eases action of placing an original on the contact glass 21a, action of maintaining the contact glass 21a, or similar actions.

The discharging rollers 7 rotate in both positive and negative directions by the control of the controller 90.

The reverse feed device 14 includes: the discharging rollers 7; conveying rollers 37 that are arranged at a position between the discharging rollers 7 and the fixing device 6 and rotates in positive and negative directions in synchronism with the discharging rollers 7 by the control of the controller 90; a reverse conveying path 38 through which the transfer paper S is reversely conveyed from the conveying rollers 37 to the pair of registration rollers 13 while bypassing the fixing device 6; and a switching claw 39 that guides the transfer paper S to the reverse conveying path 38 when the discharging rollers 7 and the conveying rollers 37 are reversely rotated.

For the transfer paper S that passes through the fixing device 6 and has a toner image fixed on its single side, the reverse feed device 14 positively rotates the discharging rollers 7 and the conveying rollers 37 and guides the transfer paper S into the conveying rollers 37 by the switching claw 39. For double-sided image formation, the reverse feed device 14 negatively rotates the discharging rollers 7 and the conveying rollers 37 at a timing at which the trailing end of the transfer paper S having a toner image fixed on its single side passes the switching claw 39. At the same time, the reverse feed device 14 switches the switching claw 39 to insert the transfer paper S into the reverse conveying path 38 and reverses the transfer paper S in the reverse conveying path 38 to feed it into the pair of registration rollers 13.

The transfer paper S passed through the reverse conveying path 38 becomes in a state where the other surface of the surface on which the toner image is fixed is directed to the transfer belt 11 while passing the fixing device 6.

Accordingly, the image forming apparatus 100 is a double-sided image forming apparatus that includes the reverse feed device 14, thereby allowing images to be formed on both sides of the transfer paper S.

The operation panel includes: for example, a single-sided print key for instructing that the image forming apparatus 100 forms an image only on the single side of the transfer paper S; a double-sided print key for instructing that the image forming apparatus 100 forms images on both sides of the transfer paper S; a numerical keypad for instructing the number of sheets on which images are formed, or the like; and a print start key for instructing the start of image formation.

The controller 90 includes: for example, a central processing unit (CPU) (not illustrated); a read-only memory (ROM) 91 as a first storage unit that stores therein an action program of the image forming apparatus 100 and various data necessary for the action in the action program; and a random-access memory (RAM) (not illustrated) as a second storage unit that stores therein data necessary for the action of image forming apparatus 100.

The structures of the image stations 60BK, 60Y, 60M, and 60C are described using one of them, that is, the structure of the image station 60BK including the photosensitive drum 20BK as representative. The structures of the other image stations are substantially the same with the structure of the image station 60BK. Therefore, for convenience, the structures of the other stations are assigned with reference numerals corresponding to the reference numerals assigned to the structure of the image station 60BK in the following description, and detailed description is omitted as needed. The components assigned with BK, Y, M, and C provided at the ends of the reference numerals indicate structures for forming black, yellow, magenta, and cyan images, respectively.

The image station 60BK including the photosensitive drum 20BK includes: the primary transfer rollers 12BK around the photosensitive drum 20BK along a rotation direction B1 that is a clockwise direction in FIG. 1; a cleaning device 70BK for cleaning the photosensitive drum 20BK; a charging device 30BK for charging the photosensitive drum 20BK at high voltage; an exposure device 8BK that is an optical writing unit as an optical writing device that is a writing unit as an exposure unit; and a developing device 50BK for developing the photosensitive drum 20BK.

The photosensitive drum 20BK, the cleaning device 70BK, the charging device 30BK, the exposure device 8BK, and the developing device 50BK are integrated to constitute a process cartridge. The process cartridge is detachably fixed to the main body 99. Thus integrated process cartridge may be treated as a replacement component, and therefore, maintainability is significantly improved, which is highly preferable.

The photosensitive drum 20BK is rotationally driven at a peripheral speed of 120 mm/s.

The charging device 30BK includes: a brush roller serving as a charging member whose detailed description is omitted; and a high voltage power source (not illustrated) applying bias to the brush roller. The brush roller makes contact with and is pressed onto the surface of the photosensitive drum 20BK and is rotated by the rotation of the photosensitive drum 20BK. The high voltage power source applies bias obtained by superimposing alternating current (AC) on direct current (DC) to the brush roller, however DC bias may be applied. The surface of the photosensitive drum 20BK is uniformly charged at −500 volts by the charging device 30BK.

The developing device 50BK includes: a developing roller 51BK provided at a position facing the photosensitive drum 20BK; a developing roller driving motor (not illustrated) serving as a driving source that drives the developing roller 51BK in rotation; and a high voltage power source (not illustrated) that applies developing bias to the developing roller 51BK.

The developing roller 51BK has a diameter of φ12 millimeters and is driven in rotation by the developing roller driving motor at a linear velocity of 160 mm/s. The controller 90 controls the driving of the developing roller driving motor. The developing device 50BK performs one component contact development and uses toner having a normal charge property of negative polarity as a developer. The developing device 50BK accommodates, in its new state, in other words, initially, 180 grams of the toner.

The exposure device 8BK radiates light to an area on the photosensitive drum 20BK between a charging area facing the charging device 30BK and a developing area facing a developing device 50BK to expose the surface of the photosensitive drum 20BK to be scanned as an exposure object after the surface is charged by the charging device 30BK. In such a manner, an electrostatic latent image visualized as a black toner image is written by the developing device 50BK according to image information.

The detail of the exposure device 8BK is described later.

The image forming apparatus having the structure as described above forms an image in full color in the following manner. The print start key of the operation panel is pressed to rotate the photosensitive drum 20BK in the B1 direction. The surface of the photosensitive drum 20BK is uniformly charged by the charging device 30BK and is exposed to light output from the exposure device 8BK to form an electrostatic latent image based on image information corresponding to black color. The electrostatic latent image is formed in the following manner. The surface of the photosensitive drum 20BK is irradiated with light output from the exposure device 8BK in a direction parallel to a main-scanning direction as a first direction that is a direction perpendicular to paper surface. The irradiation is also performed in a sub-scanning direction that is the circumferential direction of the photosensitive drum 20BK by the rotation of the photosensitive drum 20BK in the B1 direction as a second direction intersecting the main-scanning direction, that is, the moving direction of the photosensitive drum 20BK. Thus, scanning is performed.

Charged black toner supplied by the developing device 50BK adheres to the electrostatic latent image formed in the above-described manner. The image is developed in black and is visualized to be a black toner image as a visible image. The obtained black toner image is primary-transferred by the primary transfer roller 12BK onto the transfer belt 11 moving in the A1 direction. The foreign matters such as toner remaining after the transfer are scraped and removed by the cleaning device 70BK and are stocked. The photosensitive drum 20BK is prepared for the subsequent charging by the charging device 30BK.

Toner images in each color are formed or the like on the other photosensitive drums 20Y, 20M, and 20C in a similar manner. The formed toner images in each color are sequentially primary-transferred onto the transfer belt 11 moving in the A1 direction at the same position by the primary transfer rollers 12Y, 12M, and 12C.

The toner image superimposed on the transfer belt 11 moves to a transfer portion that is a secondary transfer portion at a position facing the secondary transfer roller 5 by the rotation of the transfer belt 11 in the A1 direction. The controller 90 controls the high voltage power source to apply secondary transfer bias having a predetermined level to the image, and transfers the image onto the transfer paper S at the transfer portion to perform secondary-transfer.

The transfer paper S conveyed into a portion between the transfer belt 11 and the secondary transfer roller 5 is brought up from the sheet feed device 23 and is fed at a timing at which the leading end of the toner image on the transfer belt 11 faces the secondary transfer roller 5 by the pair of registration rollers 13 based on a detection signal from the sensor.

A toner image in all colors is transferred onto the transfer paper S at once and is carried. Subsequently, the transfer paper S is separated from the transfer belt 11 due to the curvature of the transfer entrance roller 73, is conveyed in the C1 direction, and enters the fixing device 6. The carried toner image is fixed by the action of heat and pressure while passing through the fixing portion between the fixing roller 62 and the pressurizing roller 63. A color image in full color as a combined color image is formed on the transfer paper S by this fixing process.

The fixed transfer paper S passed through the fixing device 6 passes through the discharging rollers 7 and is stacked on the discharge tray 17 when the single-sided print key of the operation panel is pressed. In contrast, when the double-sided print key of the operation panel is pressed, the fixed transfer paper S passed through the fixing device 6 passes the reverse feed device 14, and a toner image is transferred and fixed on the paper again. Subsequently, the transfer paper S passes through the discharging rollers 7 and is stacked on the discharge tray 17. Every time after secondary transfer, the cleaning device cleans the transfer belt 11 to prepare for the subsequent primary transfer.

For favorably performing such image forming actions, it is important to expose the photosensitive drums 20Y, 20C, 20M, and 20BK in a favorable manner.

The typical types of exposure devices include: a first type including an optical scanner in which a light source and a polariscope such as a polygon motor are combined; and a second type including an array light source device that includes a print head collectively exposing the surface of an exposure object to light in a main-scanning direction using a light emitting diode (LED) array or an organic electroluminescent (EL) array that includes a plurality of light sources linearly arranged and a rod lens array.

The advantages of the second type against the first type include (1) having a small size, (2) having a small beam diameter to be written on an image carrier, and (3) having a longer service life. A small exposure device contributes to downsizing of an image forming apparatus. A small beam diameter contributes to higher image quality. A long service life contributes to a longer service life of an image forming apparatus and recycling of the exposure device.

The second type is employed for the exposure devices 8Y, 8C, 8M, and 8BK included in the image forming apparatus 100.

However, in the second type, it is difficult to make the exposure feasible widths on the photosensitive drums 20Y, 20C, 20M, and 20BK as exposure objects uniform in terms of the print head production. The exposure devices 8Y, 8C, 8M, and 8BK have the image formation widths different from each other. In the structure that includes a plurality of the exposure devices 8Y, 8C, 8M, and 8BK and forms a color image, like the image forming apparatus 100, when the exposure feasible widths of the exposure devices 8Y, 8C, 8M, and 8BK are different from each other, a color shift occurs during the color image formation to lower the image quality.

As conceivable measures against such problems is that the addition or deletion of image data used for driving the print head is performed in a main-scanning direction to correct the exposure feasible widths. However, when the image data is simply deleted or added, image disturbance occurs at a portion where the addition or deletion is performed along a sub-scanning direction to generate a so-called vertical streak on the output image.

Moreover, for making such an exposure feasible width of each print head uniform to be a level in which a color shift caused during color image formation becomes unnoticeable, a manufacturing technique and a mounting technique with extremely high precision are required for a print head or a component thereof, or the yield is lowered, which drives up costs.

The following structure is employed for the exposure devices 8Y, 8C, 8M, and 8BK. Although the structures of the exposure devices 8Y, 8C, 8M, and 8BK are described below, Y, C, M, and BK provided at the ends of the reference numerals are omitted because the structures are similar to each other. This is also applied to the structures of the photosensitive drums 20Y, 20C, 20M, and 20BK and the other components.

Figure 2:
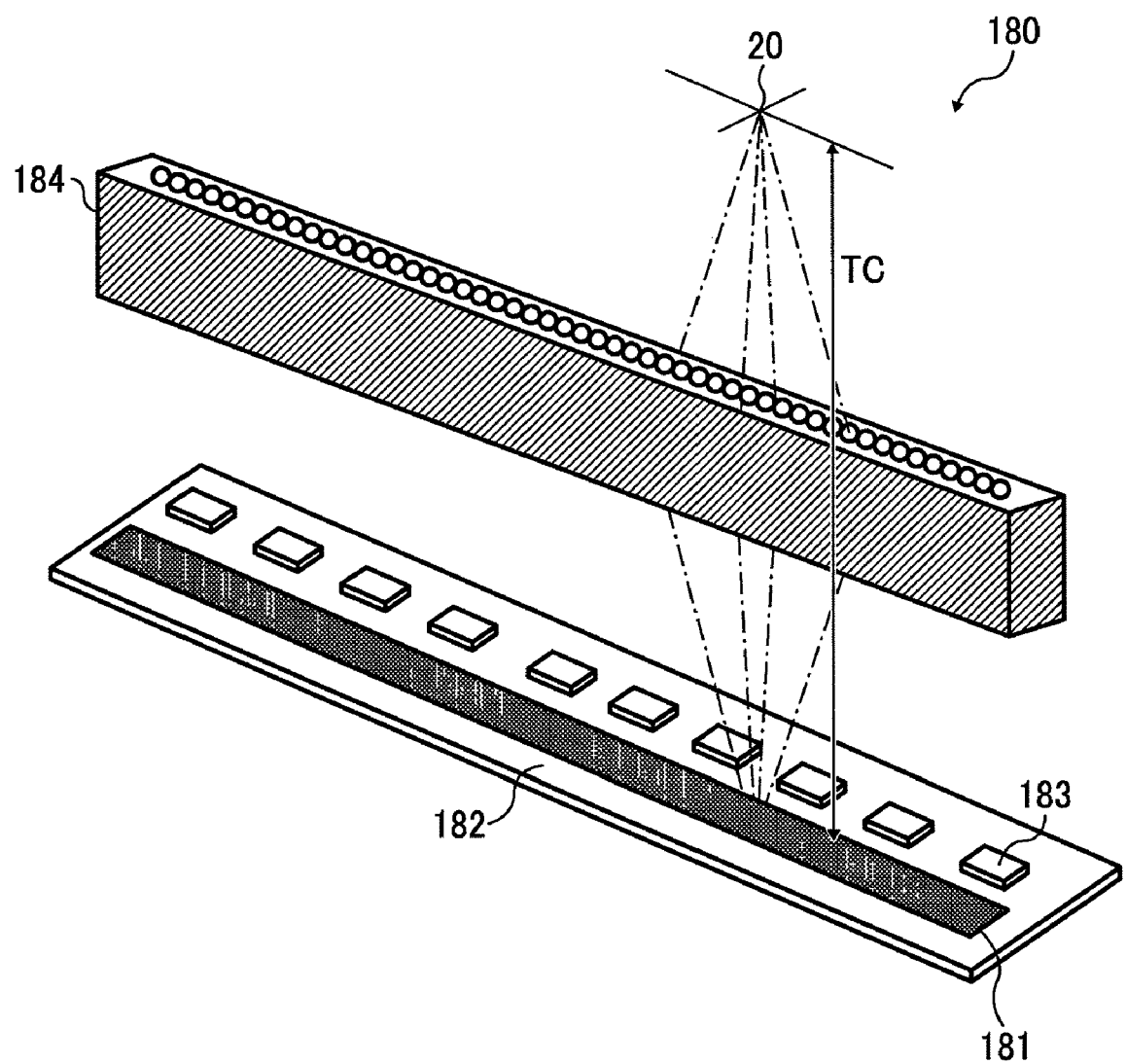
FIG. 2 is a schematic exploded perspective view of an exposure unit included in an exposure device included in the image forming apparatus as illustrated in FIG. 1.

As illustrated in FIG. 2, the exposure device 8 includes: a print head 180 as an exposure unit that irradiates the photosensitive drum 20 with light to perform exposure; and a positioning member (not illustrated) that is a positioning unit as a space regulating unit that performs positioning by regulating the space between the photosensitive drum 20 and the print head 180 in order to maintain the space between the print head 180 and the surface of the photosensitive drum 20 at a distance same as a conjugation length TC of a rod lens.

The print head 180 is an array light source device that includes: an LED array 182 that is a light source holding member as a light-emitting element array in which a plurality of LEDs 181 that is light sources of light source elements as light-emitting elements is linearly one-dimensionally arranged at a predetermined interval; a plurality of driver integrated circuits (ICs) 183 as drivers that can drive each of the LEDs 181 for exposing the photosensitive drum 20 by the LED array 182; and an image forming element array 184 including image forming elements held and positioned relative to the LED array 182 using a frame (not illustrated).

The array direction of the LEDs 181 corresponds to the main-scanning direction.

The LED array 182 includes a plurality of LED array chips (not illustrated). Each of the LED array chips includes the LEDs 181 linearly arranged in a main-scanning direction and is linearly connected to each other in the main-scanning direction to constitute the LED array 182.

The driver ICs 183 are correspondingly arranged at LED array chips on a one-on-one basis and can drive each of the LEDs 181 included in a corresponding LED array chip.

Each driver IC 183 is driven by the controller 90.

The controller 90 can drive the LEDs 181 and functions as a driving unit that is a light source driving unit for exposing the photosensitive drum 20 by the LED array 182. The controller 90 functioning as a driving unit is a part of the exposure device 8.

The image forming element array 184 employs a rod lens array in which a plurality of rod lenses (not illustrated) that are distributed refractive index type image forming elements are bound. The distance between the LED array 182 and the surface of the photosensitive drum 20 are set to have the same length as the conjugation length TC of the rod lenses, and the rod lens array is arranged at the center of the distance. The rod lens array may be a Selfoc lens array.

In the print head 180 having such a structure, light is output from each LED 181 constituting the LED array 182 that is driven based on the control by the controller 90 functioning as a driving unit. The light is formed into an image by the image forming element array 184 and is formed into a spot that is an optical spot on the surface of the photosensitive drum 20 as an imaging surface to collectively perform exposure in a main-scanning direction.

The print head 180 forms a pixel that is a minimum unit for constituting an image to be formed on the photosensitive drum 20 corresponding to the print head 180 with spots at a position on the photosensitive drum 20 corresponding to the LEDs 181 included in the LED array 182. A plurality of pixels is formed in a main-scanning direction and is formed in an image resolution of 600 dpi in the present embodiment. The LEDs 181 are included so as to have a print head resolution of 1200 dpi. An image resolution of 600 dpi can be obtained by forming each pixel with adjacent two spots formed on the photosensitive drum 20 by the adjacent two LEDs 181, and by controlling all of the LEDs 181 among the LEDs 181 included in the LED array 182 to be able to emit light. Moreover, a width occupied by all spots on the photosensitive drum 20 in a main-scanning direction becomes an exposure feasible width.

However, the exposure device 8 does not always control all of the LEDs 181 among the LEDs 181 included in the LED array 182 to be able to emit light. The exposure feasible width on the photosensitive drum 20 can be controlled by controlling the multiple LEDs 181 among the LEDs 181 included in the LED array 182 to be able to emit light while the number of pixels is maintained in a main-scanning direction, that is, an image resolution of 600 dpi.

Each pixel formed on the photosensitive drum 20 in a main-scanning direction is formed with a group of a plurality of spots or a single spot. The spot(s) are on the photosensitive drum 20 at a position corresponding to the multiple LEDs 181 that are controlled to be able to emit light among the LEDs 181 included in the LED array 182.

The controller 90 functioning as a driving unit controls the multiple LEDs 181 among the LEDs 181 included in the LED array 182 to be able to emit light so that the number of image data of image information used for forming image in a main-scanning direction corresponds to the number of pixels in the same direction. The total width of the spots formed on the photosensitive drum 20 by the multiple LEDs 181 controlled to be able to emit light in a main-scanning direction is set as the exposure feasible width.

The exposure feasible width can be adjusted by a 1200-dpi unit as a print head resolution, that is, by 21.2-micrometer unit. Moreover, the interval between pixels is specified with the interval between the barycentric positions of the pixels that are determined by distribution of a plurality of spots for forming each pixel or the position of a single spot. The interval is adjustable with precision in equal to or more than the 1200 dpi-unit as a print head resolution, that is, in equal to or more than the 21.2-micrometer unit.

A basic pixel is determined as a pixel formed on the photosensitive drum 20 with a predetermined number of LEDs among the LEDs 181 included in the LED array 182, that is, two LEDs 181 in the present embodiment. When one or more adjustment pixels can be formed on the photosensitive drum 20 by the LED 181 whose number is different from the predetermined number, the exposure feasible width can be adjusted while the number of pixels is maintained in a main-scanning direction.

The barycentric position of each pixel is adjustable only in a main-scanning direction by constituting each pixel with spots in line in a sub-scanning direction. Each pixel may also include spots in a plurality of lines in the sub-scanning direction, which enables the adjustment of the barycentric position of each pixel also in the sub-scanning direction. As described above, the barycentric position of each pixel is set in at least the main-scanning direction out of the main-scanning direction and the sub-scanning direction in order to inhibit or prevent a vertical streak generated along the sub-scanning direction. The exposure feasible width may be adjusted by setting the barycentric position of each pixel in at least the main-scanning direction out of the main-scanning direction and the sub-scanning direction.

A plurality of examples is described below with reference to FIGS. 3A to 11D using an example in which a basic pixel includes two spots each in both a main-scanning direction and a sub-scanning direction. In the examples, the barycentric position of each pixel is adjusted in the main-scanning direction, or in both the main-scanning direction and the sub-scanning direction to adjust and set an exposure feasible width.

In FIGS. 3A to 11D, the horizontal direction corresponds to the main-scanning direction, and the vertical direction corresponds to the sub-scanning direction. In FIGS. 3A to 11D, not only a colored area, but also a white-colored area represents a pixel. Moreover, in FIGS. 3A to 11D, exposure distribution is combination of light emission distribution of spots corresponding to each pixel, but only exposure distribution formed corresponding to colored spots is illustrated. The exposure distribution indicates the positions of the colored spots controlled to be able to emit light for constituting each pixel. However, the exposure distribution of the pixels whose exposure distribution is not illustrated is also constituted with spots similar to the spots controlled to be able to emit light for constituting the illustrated pixels. The barycentric position of each pixel corresponds to the barycentric position of exposure distribution except the examples illustrated in FIGS. 7A to 9C. The actual pixel shape is similar to the shape of the exposure distribution, and the shape of the exposure distribution can be found by observing the shape of the pixel with, for example, a microscope.

In FIGS. 3A to 11D, "A" indicates the case where all of the LEDs 181 included in the LED array 182 are controlled to be able to emit light. As representatively illustrated in FIG. 3A, the total width of exposure feasible spots corresponding to all of the LEDs 181 is represented as an exposure width.

In FIGS. 3A to 11D, "B" indicates the case where a part of the LEDs 181 among the LEDs 181 included in the LED array 182 is controlled to be able to emit light. As representatively illustrated in FIG. 3B, the total width of spots corresponding to the part of the LEDs 181 is smaller than the exposure width of "A" and is represented as an exposure feasible width. An adjustment pixel includes one spot in a main-scanning direction and two spots in a sub-scanning direction at the center. Accordingly, in FIGS. 3A to 11D, the barycentric position of an adjustment pixel of "B" is adjusted and changed from that of "A", and is set by reducing the number of spots for forming the adjustment pixel to form the adjustment pixel. Thus, the exposure feasible width is adjusted to be small. The decrease in the exposure feasible width is preferable in that the change in intervals between the mutual barycentric positions of pixels are unnoticeable as compared with the increase in the exposure feasible width as illustrated in "C" in FIGS. 3A to 11D that is described below, and in that vertical streaks are inhibited or prevented.

Moreover, in FIGS. 3A to 11D, "C" indicates the case where the multiple LEDs 181 among the LEDs 181 included in the LED array 182 is controlled to be able to emit light. As representatively illustrated in FIG. 3C, the total width of spots corresponding to the multiple LEDs 181 that can emit light is larger than the exposure width of "A" and is represented as an exposure feasible width. An adjustment pixel includes three spots in a main-scanning direction and two spots in a sub-scanning direction at the center. Accordingly, in FIGS. 3A to 11D, the barycentric position of an adjustment pixel of "C" is adjusted and changed from that of "A", and is set by increasing the number of spots for forming the adjustment pixel to form the adjustment pixel. Thus, the exposure feasible width is adjusted to be large. This structure requires to have extra LEDs 181 in a main-scanning direction and to have the exposure width of "A" that is equal to or smaller than the exposure feasible width.

Figure 3A:
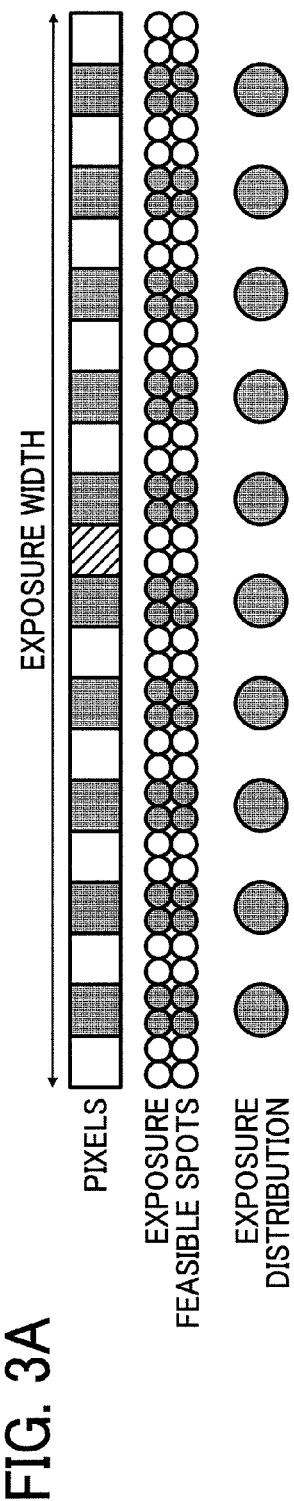
FIGS. 3A to 3C are conceptual diagrams illustrating a first exposure mode performed by the exposure device included in the image forming apparatus as illustrated in FIG. 1.
Figure 3B:
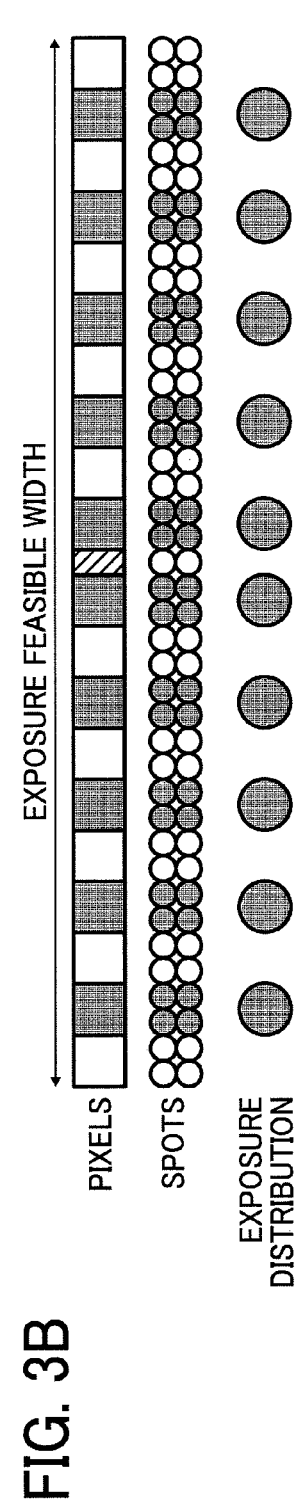
Figure 3C:
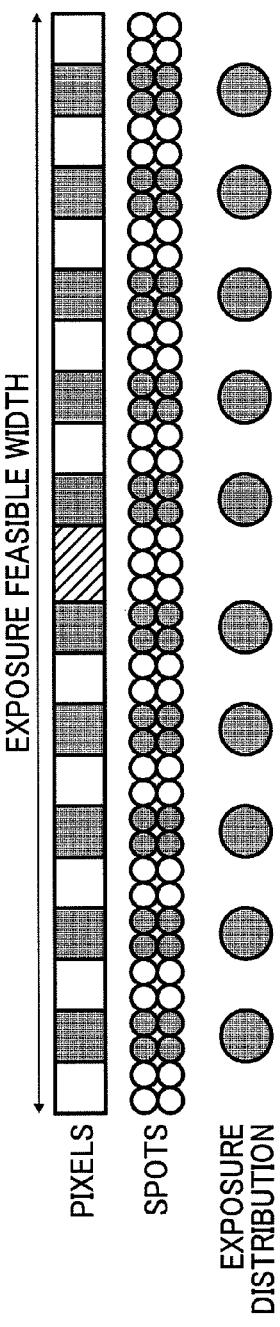

In the example illustrated in FIGS. 3A to 3C, the basic pixel includes two spots with 21.2-micrometer interval in a main-scanning direction and two spots with 21.2-micrometer interval in a sub-scanning direction, that is, a total of four spots. In FIGS. 3B and 3C in which the exposure feasible widths are adjusted, the barycentric positions of pixels whose barycentric positions are changed as compared with FIG. 3A in which the exposure feasible width is not adjusted, are set by adjusting the positions of spots forming the pixels.

The interval between the barycentric positions of the basic pixel and the adjustment pixel is adjusted to be 21.2 micrometers that is a print head resolution as with the interval between the mutual barycentric positions of the basic pixels. Accordingly, the change in the interval between the mutual pixels becomes smooth as compared with the case where image data is deleted or added in a main-scanning direction, which inhibits or prevents vertical streaks.

Figure 4A:
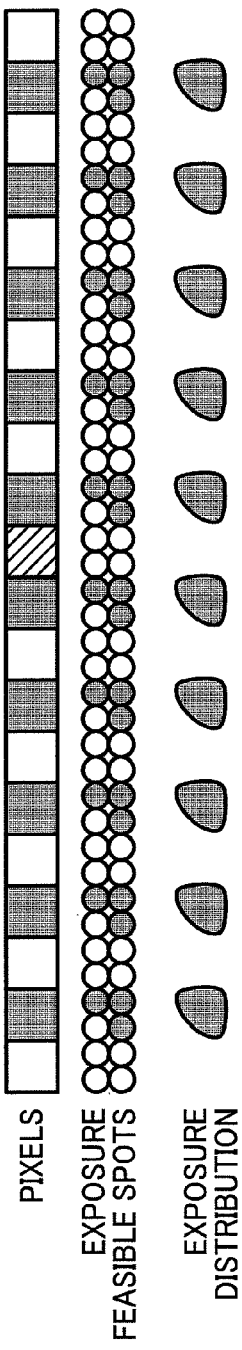
FIGS. 4A to 4C are conceptual diagrams illustrating a second exposure mode performed by the exposure device included in the image forming apparatus as illustrated in FIG. 1.
Figure 4B:
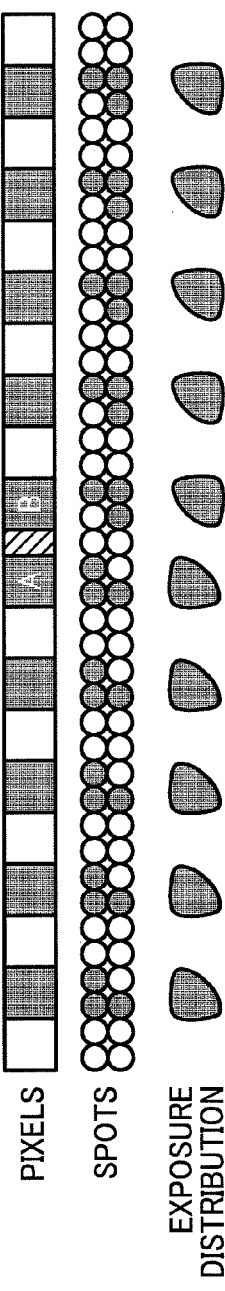
Figure 4C:
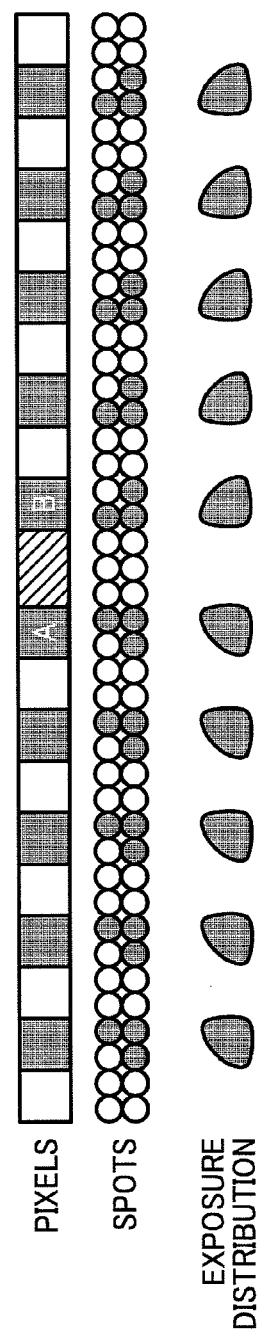

In the examples illustrated in FIGS. 4A to 4C, the basic pixel includes a total of three spots that are arranged in an L-shape with 21.2-micrometer intervals in each direction of a main-scanning direction and a sub-scanning direction. Therefore, the examples illustrated in FIGS. 4A to 4C set the barycentric position of a pixel in which the barycentric position is changed by reducing the number of spots as compared with the examples illustrated in FIGS. 3A to 3C. The shifting amount of the barycentric position can increase by reducing the number of spots to allow vertical streaks to be more inhibited or prevented.

In FIGS. 4B and 4C in which the exposure feasible widths are adjusted, the barycentric positions of pixels whose barycentric positions are adjusted and changed from the FIG. 4A, in which the exposure feasible width is not adjusted, are set by adjusting the positions of spots forming the pixels. Specifically, as illustrated in FIGS. 4B and 4C, the positions of spots constituting basic pixels are arranged to be symmetrical about a point at an adjustment pixel as apparent from the comparison between the basic pixels illustrated in FIG. 4A and the basic pixels illustrated in FIG. 4B. In FIG. 4B, while in the exposure distribution of the basic pixels on left of the adjustment pixel, the barycentric positions are disproportionately located at the upper left, in the exposure distribution of the basic pixels on right of the adjustment pixel, the barycentric positions are disproportionately located at the lower right. In FIG. 4C, while in the exposure distribution of the basic pixels on left of the adjustment pixel, the barycentric positions are disproportionately located at the lower right, in the exposure distribution of the basic pixels on right of the adjustment pixel, the barycentric positions are disproportionately located at the upper left. Although such point-symmetric arrangement is not essential, the point-symmetric arrangement is preferable in that the interval between the basic pixel indicated by a white letter A in FIG. 4C and the basic pixel indicated by a white letter B in FIG. 4C can increase.

The interval between the barycentric positions of the basic pixel and the adjustment pixel is adjusted to have a width smaller than a print head resolution of 21.2 micrometers, as compared with the interval between the mutual barycentric positions of the basic pixels. Accordingly, the adjustment of the barycentric position and the adjustment of the exposure feasible width are performed in a precision higher than the print head resolution. As a result, the change in the interval between the mutual pixels becomes smoother as compared with the examples illustrated in FIGS. 3B and 3C, which enhances the inhibition or prevention of vertical streaks.

Figure 5A:
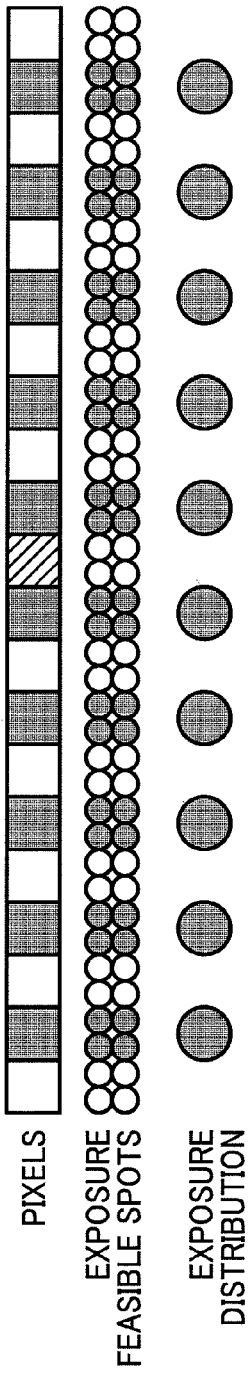
FIGS. 5A to 5C are conceptual diagrams illustrating a third exposure mode performed by the exposure device included in the image forming apparatus as illustrated in FIG. 1.
Figure 5B:
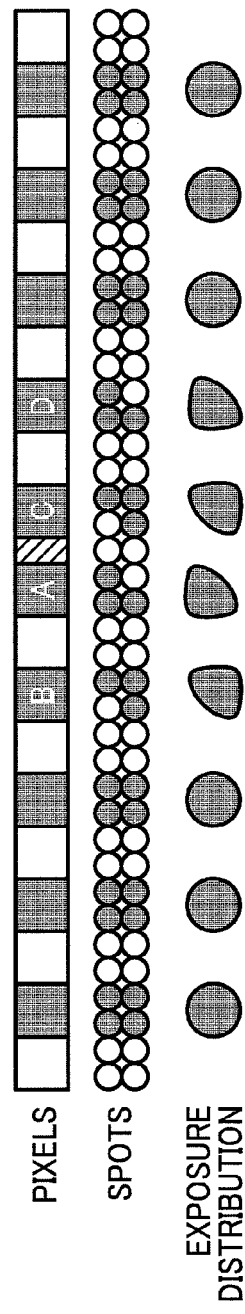
Figure 5C:
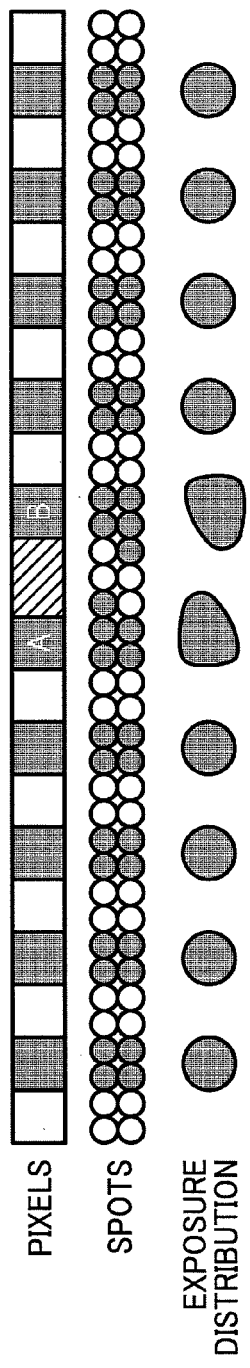

In the examples illustrated in FIGS. 5A to 5C, the basic pixel includes two spots with 21.2-micrometer interval each in a main-scanning direction and a sub-scanning direction, that is, a total of four spots. Adjustment pixels include, besides the adjustment pixel (first adjustment pixel) illustrated in FIGS. 3A to 4C, second adjustment pixels that are arranged at both sides of the first adjustment pixel and are indicated by white letters A, B, C, and D in FIG. 5B and by white letters A and B in FIG. 5C. Each of the second adjustment pixels A, B, C, and D illustrated in white letters in FIG. 5B includes three spots, and each of the second adjustment pixels A and B illustrated in white letters in FIG. 5C includes five spots. The spots constituting the second adjustment pixels are arranged to be symmetrical about a point at the first adjustment pixel. The advantage for the point-symmetric arrangement is the same as described above. The change in the interval between the mutual barycentric positions of pixels becomes smooth by providing the second adjustment pixels, which enhances the inhibition or prevention of vertical streaks.

As the examples illustrated in FIGS. 6B and 6C, the second adjustment pixels indicated by the white letter A and B in FIG. 6B and by the white letter A in FIG. 6C may be provided at only one side of the first adjustment pixel. In these examples as illustrated in FIGS. 6B and 6C, the second adjustment pixels themselves preferably have point-symmetric shapes.

As illustrated in FIGS. 7B to 9C, the barycentric positions may be set by adjusting the exposure intensity of spots. In FIGS. 7B to 9C, the concentration of color of colored spots corresponds to the exposure intensity. The concentration of color of the spots increases in correspondence with the increase in the exposure intensity, and the concentration of color of the spots decreases in correspondence with the decrease in the exposure intensity. This is the same as the example illustrated in FIG. 12.

Even when the position and the number of spots are the same, while the barycentric position changes to be closer to a spot with high exposure intensity, the barycentric position changes to be farther from a spot with low exposure intensity. The barycentric position is changed more minutely by adjusting the exposure intensity, and the change in the interval between the mutual barycentric positions of pixels becomes smoother, which enhances the inhibition or prevention of vertical streaks. In FIGS. 7B to 9C, although the exposure intensity has three stages, the exposure intensity may be adjusted in two stages or four or more stages. The exposure intensity of spots constituting one pixel may employ not only two stages but also three or more stages in combination.

In the examples illustrated in FIGS. 7A to 7C, the positions and the number of spots correspond to the modes of FIGS. 4A to 4C. Pixels adjacent to an adjustment pixel (first adjustment pixel) include a plurality of spots. The exposure intensity of a part of the spots is increased to adjust the barycentric positions of the pixels. The pixels are indicated by the white letters A and B in FIGS. 7B and 7C, and are determined as second adjustment pixels. In FIG. 7B, among the spots arranged in an L-shape, the exposure intensity of one spot that is positioned apart from the first adjustment pixel and positioned at the corner of the L-shape is increased so as to symmetrically increase the exposure intensity about a point at the first adjacent pixel. In FIG. 7C, among the spots arranged in an L-shape, the exposure intensity of two spots that are positioned close to the first adjustment pixel and positioned at the edges of the L-shape is increased so as to symmetrically increase the exposure intensity about a point at the first adjacent pixel. Accordingly, the barycentric positions of the second adjustment pixels in FIG. 7B are shifted from the barycentric positions of corresponding pixels in FIG. 4B to positions apart from the barycentric position of the first adjacent pixel. Moreover, the barycentric positions of the second adjustment pixels in FIG. 7C are shifted from the barycentric positions of corresponding pixels in FIG. 4C to positions close to the barycentric position of the first adjacent pixel.

In the examples illustrated in FIGS. 8A to 8C, the positions and the number of spots in FIG. 8B correspond to the modes of FIG. 5B. The positions and the number of spots in FIG. 8C correspond to the modes of FIG. 5C, but the spots of pixels indicated by the white letters A and B in FIG. 5C are replaced by the spots of pixels indicated by the white letters A and B in FIG. 4C. The exposure intensity of a part of a plurality of spots constituting second adjustment pixels is increased in the same modes with the examples illustrated in FIG. 7C to adjust the barycentric positions of the second adjustment pixels. Accordingly, the barycentric positions of the second adjustment pixels in FIG. 8B are shifted from the barycentric positions of corresponding pixels in FIG. 5B to positions apart from the barycentric position of the first adjacent pixel. Moreover, the barycentric positions of the second adjustment pixels in FIG. 8C are shifted from the barycentric positions of corresponding pixels in FIG. 4C to positions close to the barycentric position of the first adjacent pixel.

Figure 9A:
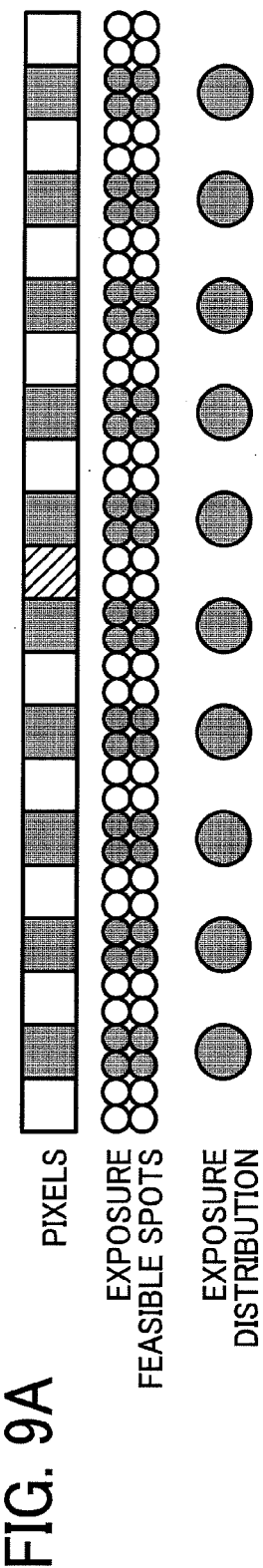
FIGS. 9A to 9C are conceptual diagrams illustrating a seventh exposure mode performed by the exposure device included in the image forming apparatus as illustrated in FIG. 1.
Figure 9B:
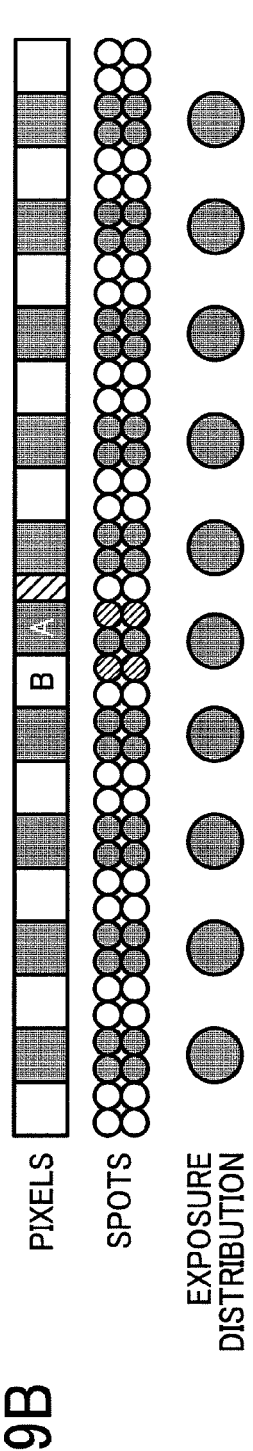
Figure 9C:
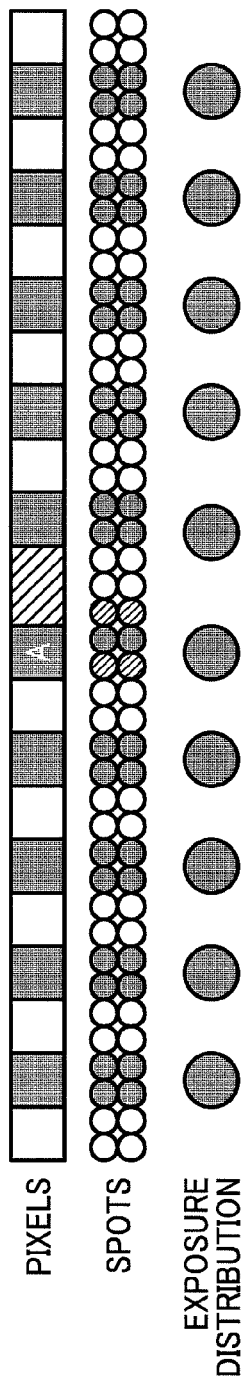

In the examples illustrated in FIGS. 9B and 9C, the positions and the number of spots are similar to those of FIGS. 6A and 6B. A second adjustment pixel includes three spots in a main-scanning direction and two spots in a sub-scanning direction, a total of six spots. The exposure intensity of a total of four spots at both sides in the main-scanning direction are set to be low, and thus, the barycentric position of the second adjustment pixel is adjusted so as to be concentrated at the center of the pixel.

As apparent from the description as described above, for the setting of barycentric position, the adjustment of the positions, number, and exposure intensity of spots can be combined as needed. The barycentric position with a high precision can be set by the combination. The control that is the easiest control for setting the barycentric position and makes vertical streaks be the most unnoticeable is the control for changing the positions of spots, like the change from FIG. 4A to FIG. 4B or 4C. Therefore, when the adjustments of the positions, number, and exposure intensity of spots are combined, the combination of the control for changing the positions of spots with the other controls is preferable. As for the combination of two types of adjustments, the combination of the positions and exposure intensity of spots is the most preferable for inhibiting or preventing vertical streaks.

FIGS. 10A to 11D indicate numerical examples obtained by using the examples illustrated in FIGS. 3A to 4C.

These examples are simulation of exposure distributions and barycentric positions using measured beam profiles of an LED head (1200 dpi). One pixel is assumed to be 600 dpi, and a print head resolution is assumed to be 1200 dpi.

Simulation results of exposure distributions illustrated in FIGS. 10A, 10B, and 10C are compared with those in FIGS. 11A, 11B, and 11C. At first glance, it is apparent that the fluctuation of intervals between the exposure distributions of pixels indicated by the white letters A, B, C, and D in FIGS. 11A, 11B, and 11C in the exposure distributions illustrated in FIGS. 11A, 11B, and 11C is smaller than that of FIGS. 10A, 10B, and 10C.

Calculation results of distances between the mutual barycentric positions of pixels indicated by the white letters A, B, C, and D in FIGS. 10D and 11D are indicated in FIGS. 10D and 11D. The x direction corresponds to a main-scanning direction, the y direction corresponds to a sub-scanning direction, and the barycentric position of each pixel is located at (0, 0) coordinates. The barycentric position is calculated while considering only a peak intensity of equal to 50% or over.

In the examples illustrated in FIGS. 10A to 10C, the distance between the mutual barycentric positions of the pixel A and the pixel B, the distance between the mutual barycentric positions of the pixel B and the pixel C, and the distance between the mutual barycentric positions of the pixel C and the pixel D are 42.3 micrometers, 42.3 micrometers, and 42.3 micrometers, respectively, before interval correction as illustrated in FIG. 10A. When the interval is reduced as illustrated in FIG. 10B, the distances described above becomes 42.3 micrometers, 21.2 micrometers, and 42.3 micrometers, respectively. As a result, the distance between the mutual barycentric positions of the pixel B and the pixel C becomes extremely small to easily generate a vertical streak between the pixel B and the pixel C. When the interval is increased as illustrated in FIG. 10C, the distances described above becomes 42.3 micrometers, 63.5 micrometers, and 42.3 micrometers, respectively. As a result, the distance between the mutual barycentric positions of the pixel B and the pixel C becomes extremely large to easily generate a vertical streak between the pixel B and the pixel C.

In the examples illustrated in FIGS. 11A to 11C, the distance between the mutual barycentric positions of the pixel A and the pixel B, the distance between the mutual barycentric positions of the pixel B and the pixel C, and the distance between the mutual barycentric positions of the pixel C and the pixel D are 42.3 micrometers, 42.3 micrometers, and 42.3 micrometers, respectively, before interval correction as illustrated in FIG. 11A, which is the same as those illustrated in FIG. 10A. When the interval is reduced as illustrated in FIG. 11B, the distances described above becomes 42.3 micrometers, 30.4 micrometers, and 42.3 micrometers, respectively. As a result, the change in the distance between the mutual barycentric positions of the pixel B and the pixel C is significantly reduced as compared with the change in FIG. 10B to largely inhibit the generation of a vertical streak between the pixel B and the pixel C. When the interval is increased as illustrated in FIG. 11C, the distances described above becomes 42.3 micrometers, 55.4 micrometers, and 42.3 micrometers, respectively. As a result, the change in the distance between the mutual barycentric positions of the pixel B and the pixel C is significantly reduced as compared with the change in FIG. 10C to largely inhibit the generation of a vertical streak between the pixel B and the pixel C.

In the examples described above, although each pixel is formed of a plurality of spots in a sub-scanning direction, each pixel may also be formed of a single spot in a sub-scanning direction. However, when each pixel is formed of a single spot in a sub-scanning direction, the barycentric position is controlled only in a main-scanning direction. When each pixel is formed of a plurality of spots in a sub-scanning direction, the change in the barycentric position can be assigned in a sub-scanning direction. This allows the barycentric position to be controlled also in a sub-scanning direction to enhance the inhibition or prevention of vertical streaks. For controlling the barycentric position also in a sub-scanning direction, the arrangement position of spots constituting the pixel, that is, exposure distribution, may be asymmetrical in a sub-scanning direction, for example, as the examples illustrated in FIGS. 4B and 4C. Such asymmetrical formation may not be performed on all pixels but may be performed on at least one pixel, for example, on a part of pixels as the examples illustrated in FIGS. 5B and 5C.

The controller 90 functioning as a driving unit includes the ROM 91 as a storage unit in which a plurality of spot patterns for forming each pixel is stored. The spot patterns for forming an image are selected and used among a plurality of patterns stored in the ROM 91 functioning as a storage unit.

Figure 12:
FIG. 12 is a conceptual diagram illustrating an example of spot patterns stored in a storage unit included in the exposure device included in the image forming apparatus as illustrated in FIG. 1.

The ROM 91 functioning as a storage unit stores therein several bits of, that is in FIG. 12, a digital value of 4 bits of, the spot patterns illustrated in FIG. 12 as examples corresponding to the examples illustrated in FIGS. 3A to 11C. Therefore, the storage capacity of the ROM 91 functioning as a storage unit, that is, the amount of memory can be reduced as compared with the case where the spot patterns of all pixels formed in a main-scanning direction are stored in sets. Moreover, the control by the controller 90 functioning as a driving unit can be simplified.

In the image forming apparatus 100, when the exposure feasible widths of the exposure devices 8Y, 8C, 8M, and 8BK are different, a color shift occurs while toner images in each color formed by the image stations 60BK, 60Y, 60M, and 60C are superimposed. Therefore, the control as described above is performed so that the exposure feasible widths of the exposure devices 8Y, 8C, 8M, and 8BK become the same with each other in order to prevent or inhibit this color shift. An optional exposure width among the exposure widths of each of the exposure devices 8Y, 8C, 8M, and 8BK is adjusted so as to be an exposure feasible width of each of the exposure devices 8Y, 8C, 8M, and 8BK. In this case, it is most preferable that the smallest exposure width among the exposure widths of each of the exposure devices 8Y, 8C, 8M, and 8BK is adjusted so as to be an exposure feasible width of each of the exposure devices 8Y, 8C, 8M, and 8BK. This is because, as already described above, when the exposure feasible width is changed to be reduced, the change in intervals between the mutual barycentric positions of pixels are unnoticeable as compared with the change for increasing the exposure feasible width to enhance the inhibition or prevention of vertical streaks.

The timing at which the exposure feasible width is set in such a manner are, when the image forming apparatus 100 is shipped, and when a so-called process control is performed. The process control typically includes: for example, the image formation performed by user designation; adjustment of the concentration of toner images formed by the image stations 60BK, 60Y, 60M, and 60C that are obtained by forming toner images called reference toner images or the like by the image stations 60BK, 60Y, 60M, and 60C using the reference toner images formed by the image stations 60BK, 60Y, 60M, and 60C; and positioning of each toner image. The toner mark sensor 33 is used during this process. For making the exposure feasible widths of the exposure devices 8Y, 8C, 8M, and 8BK be the same with each other, the controller 90 functioning as a driving unit uses the widths of the reference toner images in each color measured by the toner mark sensor 33 in a main-scanning direction and sets the exposure feasible widths of the exposure devices 8Y, 8C, 8M, and 8BK so that each width agrees with each other.

When the positions of the adjustment pixel, the first adjustment pixel, and the second adjustment pixel all of whose number of spots are different from the number of spots forming the other pixels in a main-scanning direction are always unchanged in a sub-scanning direction, vertical streaks can be generated. In view of this, the setting modes of the barycentric positions of the adjustment pixel, the first adjustment pixel, the second adjustment pixel, and further basic pixels in a main-scanning direction may be set by the controller 90 functioning as a driving unit so as to be different from each other in a sub-scanning direction. This case is described with the examples illustrated in FIGS. 3A to 11D. In these examples, each pixel is formed of two line spots lined in a sub-scanning direction. Therefore, the setting modes of the barycentric positions of pixels may vary in a sub-scanning direction by displacing spots in a main-scanning direction by two line spots that forms each pixel and is lined in a sub-scanning direction. Moreover, the inhibition or prevention of vertical streaks is more preferably enhanced by more minutely displacing the positions of pixels in a main-scanning direction by one line spot lined in a sub-scanning direction to vary the setting modes of the barycentric positions of pixels in a sub-scanning direction.

The present invention is described above according to preferable exemplary embodiments of the present invention, but is not limited to the specific embodiments. Various changes and modifications may be made without departing from the spirit and scope of the present invention as claimed in claims, unless limited by the description as described above.

For example, the light source may not be an LED but may be another light-emitting element such as an organic EL, and the array may not be one-dimensional but may be two-dimensional. A microlens array or the like may also be used instead of a load lens array. Moreover, the driver IC 183 does not necessarily need to be provided at each LED array chip on a one-on-one basis. For example, one driver IC may drive all LED array chips.

When a light source array manufactured by connecting a plurality of light source array chips in line in a main-scanning direction as with the LED array 182 indicated in the embodiment described above, the adjustment pixel, the first adjustment pixel, and the second adjustment pixel may be set as a joint of the light source array chips. However, the adjustment pixel, the first adjustment pixel, and the second adjustment pixel are more preferably set to avoid being used as a joint of the light source array chips because vertical streaks are easily generated at the joint as compared with the other places.

Even when being a tandem type, the image forming apparatus to which the present invention is applied can employ not only the indirect transfer system as described above, but also a direct transfer system. The image forming apparatus includes a sheet conveying belt as a recording medium conveying body instead of the transfer belt 11, and subsequently superimposes and transfers toner images in each color formed by the image stations onto transfer paper in a state of being conveyed by the sheet conveying belt.

The image forming apparatus to which the present invention is applied may not be the so-called tandem type image forming apparatus, but may be a so-called one-drum type image forming apparatus by which toner images in each color are subsequently formed on one photosensitive drum to be subsequently superimposed to obtain a color image.

In recent years, image forming apparatuses are usually color image forming apparatuses such as color copiers and color printers according to the demands of the market, however, image forming apparatuses capable of forming only monochrome images may also be applicable.

A developer used in such image forming apparatuses may be not only a one-component developer but also a two-component developer.

The image forming apparatus may not only be a multifunction device of a copier, a printer, and a facsimile, but may be a single body of them, and further be a multifunction device of the other combinations such as a multifunction device of a printer and a copier.

The barycentric positions of the pixels can be set at least in the first direction by adjusting the positions of the spots forming the pixels. Thus, the exposure device that can adjust the exposure feasible width while keeping costs low, and inhibiting or preventing image disturbance and that can contribute to favorable image formation can be provided.

The barycentric positions of the pixels can be set at least in the first direction by adjusting the number of the spots forming the pixels. Thus, the exposure device that can adjust the exposure feasible width while keeping costs low, and inhibiting or preventing image disturbance and that can contribute to favorable image formation can be provided.

The barycentric positions of the pixels can be set at least in the first direction by adjusting the number of the spots forming the pixels to be reduced, thereby enabling the barycentric positions to be set so as to be more largely changed. Thus, the exposure device that can adjust the exposure feasible width while keeping costs low, and more favorably inhibiting or preventing image disturbance and that can contribute to more favorable image formation can be provided.

The barycentric positions of the pixels can be set at least in the first direction by adjusting the exposure intensity of the spots forming the pixels. Thus, the exposure device that can adjust the exposure feasible width while keeping costs low, and inhibiting or preventing image disturbance and that can contribute to favorable image formation can be provided.

The barycentric positions of the pixels can be set in the first direction and the second direction, thereby assigning the adjustment of the barycentric positions also to the second direction. Thus, the exposure device that can adjust the exposure feasible width while keeping costs low, and more favorably inhibiting or preventing image disturbance and that can contribute to more favorable image formation can be provided.

The barycentric positions of the pixels can be set at least in the first direction by the control capable of being simplified and capable of reducing the memory amount stored in the storage unit. Thus, the exposure device that can adjust the exposure feasible width while keeping costs low, and inhibiting or preventing image disturbance and that can contribute to favorable image formation can be provided.

The barycentric positions of the pixels can be set at least in the first direction. Thus, the exposure device in which the change in the intervals between the barycentric positions is unnoticeable, that can adjust the exposure feasible width while keeping costs low, and more favorably inhibiting or preventing image disturbance, and that can contribute to more favorable image formation can be provided.

The barycentric positions of the pixels can be set at least in the first direction. Thus, the exposure device that can adjust the exposure feasible width while keeping costs low, and making image disturbance be unnoticeable and be more favorably inhibited or prevented, and that can contribute to more favorable image formation can be provided.

The barycentric positions of the pixels can be set at least in the first direction. Thus, the exposure device that can adjust the exposure feasible width while keeping costs low and making image disturbance be more unnoticeable and be further favorably inhibited or prevented, and that can contribute to further favorable image formation can be provided.

The basic pixel and the adjustment pixel can be formed. Thus, the exposure device that can adjust the exposure feasible width while keeping costs low and inhibiting or preventing image disturbance and that can contribute to favorable image formation can be provided.

The image forming apparatus that can adjust the exposure feasible width while keeping costs low and inhibiting or preventing image disturbance and that can perform favorable image formation can be provided.

The image forming apparatus that can adjust the exposure feasible width while keeping costs low and inhibiting or preventing image disturbance and that can perform favorable image formation by inhibiting or preventing the displacement of images formed by each exposure device can be provided.

The image forming apparatus in which the change in the intervals between the pixels is unnoticeable, that can adjust the exposure feasible width while keeping costs low and more favorably inhibiting or preventing image disturbance, and that can perform favorable image formation by more favorably inhibiting or preventing the displacement of images formed by each exposure device can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An exposure device comprising:
an exposure unit including a plurality of light sources linearly arranged; and
a driving unit that is configured to drive each of the light sources to make the exposure unit expose an exposure object,
wherein the exposure device forms a plurality of pixels with spots on the exposure object at a position corresponding to the light sources,
each of the pixels is formed with a group of a plurality of spots or a single spot,
a barycentric position of each of the pixels is determined by distribution of the spots or a position of the single spot, and
while the driving unit maintains number of pixels on the exposure object in a first direction corresponding to an array direction of the light sources, an exposure feasible width within which the exposure unit performs exposure on the exposure object is adjustable in the first direction by the driving unit setting the barycentric position at least in the first direction out of the first direction and a second direction that is a moving direction of the exposure object.

2. The exposure device according to claim 1, wherein the driving unit sets the barycentric position by adjusting position of spots forming the pixels.

3. The exposure device according to claim 1, wherein the driving unit sets the barycentric position by adjusting number of spots forming the pixels.

4. The exposure device according to claim 3, wherein the driving unit sets the barycentric position by changing the number of spots forming the pixels to be reduced.

5. The exposure device according to claim 1, wherein the driving unit sets the barycentric position by adjusting exposure intensity of spots forming the pixels.

6. The exposure device according to claim 1, wherein each of the pixels is formed with a plurality of spots in the second direction, and the driving unit sets the barycentric position of at least one pixel among the pixels so as to be changed in the second direction.

7. The exposure device according to claim 1, further comprising a storage unit that stores therein a plurality of patterns of a plurality of spots forming the pixels, wherein the driving unit selects and uses patterns of a plurality of spots for forming a pixel among the patterns stored in the storage unit.

8. The exposure device according to claim 1, wherein the driving unit sets the barycentric position so as to adjust the exposure feasible width to be reduced.

9. The exposure device according to claim 1, wherein the driving unit sets the setting mode of the barycentric position in the first direction so as to differ in the second direction.

10. The exposure device according to claim 9, wherein the driving unit sets the barycentric position in the first direction by differentiating number of spots forming at least one pixel among the pixels from number of spots forming the other pixels in the first direction, and the setting mode of the barycentric position in the first direction differs in the second direction by differentiating a position of the pixel(s) whose number of spots is different from the number of spots forming the other pixels in the second direction.

11. An image forming apparatus comprising the exposure device according to claim 1.

12. The image forming apparatus according to claim 11, wherein the image forming apparatus includes the exposure device in plurality, and an optional exposure width out of exposure widths on an exposure object formed by the exposure unit included in each exposure device in the first direction is adjusted so as to be an exposure feasible width within which the exposure device performs exposure.

13. The image forming apparatus according to claim 12, wherein a minimum exposure width out of the exposure widths on the exposure object formed by the exposure unit included in each exposure device in the first direction is adjusted so as to be the exposure feasible width within which the exposure device performs exposure.

* * * * *